US011833485B2

(12) United States Patent
Alhooshani et al.

(10) Patent No.: US 11,833,485 B2
(45) Date of Patent: *Dec. 5, 2023

(54) AZOLE-FUNCTIONALIZED SILICA ADSORBENT

(71) Applicant: KING FAHD UNIVERSITY OF PETROLEUM AND MINERALS, Dhahran (SA)

(72) Inventors: Khalid Alhooshani, Dhahran (SA); Abdulkadir Tanimu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 136 days.

This patent is subject to a terminal disclaimer.

(21) Appl. No.: 17/708,582

(22) Filed: Mar. 30, 2022

(65) Prior Publication Data

US 2022/0219143 A1 Jul. 14, 2022

Related U.S. Application Data

(63) Continuation of application No. 16/296,480, filed on Mar. 8, 2019, now Pat. No. 11,305,259.

(51) Int. Cl.
*B01J 20/32* (2006.01)
*B01J 20/10* (2006.01)
*B01J 20/28* (2006.01)

(52) U.S. Cl.
CPC ......... *B01J 20/3255* (2013.01); *B01J 20/103* (2013.01); *B01J 20/28061* (2013.01); *B01J 20/28071* (2013.01); *B01J 20/28073* (2013.01); *B01J 20/28083* (2013.01); *B01J 20/3236* (2013.01); *B01J 2220/46* (2013.01)

(58) Field of Classification Search
CPC ...... B01J 20/32; B01J 20/3255; B01J 20/103; B01J 20/28061; B01J 20/28071; B01J 20/28073; B01J 20/28083; B01J 20/3236; B01J 2220/46

USPC .......................................................... 502/407
See application file for complete search history.

(56) References Cited

U.S. PATENT DOCUMENTS 11,305,259 B2 * 4/2022 Alhooshani .......... B01J 20/3236

FOREIGN PATENT DOCUMENTS

| CN | 104084135 A | 10/2014 |
|---|---|---|
| CN | 105110406 B | 11/2017 |
| CN | 105032382 B | 5/2018 |
| CN | 105107465 B | 5/2018 |
| CN | 108212094 A | 6/2018 |

OTHER PUBLICATIONS

Toufaily, et al. ; Functionalization of SBA-15 materials for the adsorption of phenols from aqueous solution ; Open Engineering ; Mar. 2012 ; 10 Pages.
Anbia, et al. ; Adsorption of phenolic compounds from aqueous solutions using functionalized SBA-15 as a nano-sorbent ; Scientia Iranica, vol. 18, issue 3 ; pp. 446-452 ; Jun. 2011 ; 11 Pages.
Nasreem, et al. ; Hybrid mesoporous silicates: A distinct aspect to synthesis and application for decontamination of phenols ; Saudi Journal of Biological Sciences ; Aug. 23, 2015 ; 10 Pages.
Tanimu, et al. ; 4-phenyl-1,2,3-triazole functionalized mesoporous silica SBA-15 as sorbent in an efficient stir bar-supported micro-solid-phase extraction strategy for highly to moderately polar phenols ; Talanta 194 ; pp. 377-384 ; Oct. 17, 2018 ; 8 Pages.

* cited by examiner

*Primary Examiner* — Edward M Johnson
(74) *Attorney, Agent, or Firm* — Oblon, McClelland, Maier & Neustadt, L.L.P.

(57) ABSTRACT

A functionalized silica sorbent is described. The sorbent comprises mesoporous silica nanoparticles having a surface functionalized with a conjugated system comprising an azole and a phenyl. The surface may be functionalized by a Cu-catalyzed click reaction. The nanoparticles have an average particle size of 10-80 nm, and may be used to adsorb phenolic contaminants from aqueous solutions.

7 Claims, 21 Drawing Sheets

AZOLE-FUNCTIONALIZED SILICA ADSORBENT

CROSS-REFERENCE TO RELATED APPLICATIONS

The present application is a Continuation of U.S. application Ser. No. 16/296,480, now allowed, having a filing date of Mar. 8, 2019.

STATEMENT REGARDING PRIOR DISCLOSURES BY THE INVENTORS

Aspects of this technology are described in an article Tanimu, A.; Jillani, S. M. S.; Alluhaidan, A. A.; Ganiyu, S. A.; and Alhooshani, K., "4-phenyl-1,2,3-triazole functionalized mesoporous silica SBA-15 as sorbent in an efficient stir bar-supported micro-solid-phase extraction strategy for highly to moderately polar phenols," Talanta, 194 (2019) 377-384, doi: 10.1016/j.talanta.2018.10.012, which is incorporated herein by reference in its entirety.

STATEMENT OF ACKNOWLEDGEMENT

The inventors acknowledge the support provided by the Chemistry Department of King Fahd University of Petroleum and Minerals (KFUPM).

BACKGROUND OF THE INVENTION

Technical Field

The present invention relates to a functionalized silica sorbent, a method of making, and a method of using to adsorb a contaminant from an aqueous solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Phenols, a type of aromatic compound that has a hydroxyl group (—OH) bonded to a phenyl ring, have many applications in pharmaceutical industries, food companies, and petrochemicals industries, and are commonly found in polymer, dyes, and pesticides. See T. Dohi, A. Maruyama, N. Takenaga, K. Senami, Y. Minamitsuji, H. Fujioka, S. B. Caemmerer, Y. Kita, A chiral hypervalent iodine(iii) reagent for enantioselective dearomatization of phenols, Angew. Chemie Int. Ed. 47 (2008) 3787-3790; X. Ye, A. M. Bishop, L. L. Needham, A. M. Calafat, Automated on-line column-switching HPLC-MS/MS method with peak focusing for measuring parabens, triclosan, and other environmental phenols in human milk, Anal. Chim. Acta. 622 (2008) 150-156; and A. Llop, E. Pocurull, F. Borrull, Evaluation of the removal of pollutants from petrochemical wastewater using a membrane bioreactor treatment plant, Water. Air. Soil Pollut. 197 (2009) 349-359, each incorporated herein by reference in their entirety. Additionally, phenol derivatives, such as pentachlorophenol, are used as a preservative in sawmills, and the slow degradation of lignin in the pulp and paper industry generates phenols. The treatment of drinking water and swimming pool water can lead to the formation of chlorophenols. See A. V. Kolliopoulos, D. K. Kampouris, C. E. Banks, Indirect electroanalytical detection of phenols, Analyst. 140 (2015) 3244-3250, incorporated herein by reference in its entirety. These phenolic compounds are mostly toxic and generally unpleasant, even at very low concentrations. See G. Galati, P. J. O'Brien, Potential toxicity of flavonoids and other dietary phenolics: significance for their chemopreventive and anticancer properties, Free Radic. Biol. Med. 37 (2004) 287-303, incorporated herein by reference in its entirety. For example, upon exposure to the skin or when inhaled, they can induce a high degree of skin and eye irritation. In some cases, long-term effects include liver and heart failure. As such, the US Environmental Protection Agency (EPA) and the European Union (EU) have classified several phenolic compounds as priority pollutants with a maximum limit of gross phenols in drinking water being 0.5 µg/L. See 1. Rodriguez, M. P. Llompart, R. Cela, Solid-phase extraction of phenols (Review), J. Chromatogr. 885 (2000) 291-304, incorporated herein by reference in its entirety.

Because of these harmful effects of phenols and the stringent regulations limiting phenolic compounds in drinking water, there has been an intensifying interest in finding new sorbents for phenolic compound extraction in addition to emerging analytical methods for its determination. Silica based sorbents were among the first types of sorbents used to extract phenols using solid phase extraction (SPE); however, they are limited to mostly non-polar phenols, especially $C_{18}$. See I. Rodriguez, R. Cela, Combination of solid-phase extraction procedures with gas chromatographic hyphenated techniques for chlorophenol determination in drinking water, TrAC—Trends Anal. Chem. 16 (1997) 463-474, incorporated herein by reference in its entirety. SBA-15, a silica based mesoporous material, is known to be an outstanding material for the trapping of different kinds of analytes in various solution matrices. The excellent sorption abilities are due to its exceptional mechanical, thermal and chemical stabilities, in addition to its large surface area and porosity. Moreover, SBA-15 is extremely inexpensive and simply obtained. Modification of SBA-15 through functionalization or metal loading has shown significant improvement in various applications including 1) heterogeneous catalysis, 2) enzymatic immobilization such as encapsulation, 3) sensing, 4) drug delivery, and 5) adsorption studies. See S. A. Ganiyu, S. A. Ali, K. Alhooshani, Synthesis of a Ti-SBA-15-NiMo hydrodesulfurization catalyst: the effect of the hydrothermal synthesis temperature of NiMo and molybdenum loading on the catalytic activity, Ind. Eng. Chem. Res. 56 (2017) 5201-5209; C. Rother, B. Nidetzky, Enzyme immobilization by microencapsulation: methods, materials, and technological applications, in: Encycl. Ind. Biotechnol., John Wiley & Sons, Inc., Hoboken, NJ, USA, 2014: pp. 1-21; Y. Zhu, Z. Cheng, Q. Xiang, Y. Zhu, J. Xu, Rational design and synthesis of aldehyde-functionalized mesoporous SBA-15 for high-performance ammonia sensor, Sensors Actuators, B Chem. 256 (2018) 888-895; T. Azaïs, G. Laurent, K. Panesar, A. Nossov, F. Guenneau, C. Sanfeliu Cano, C. Tourné-Péteilh, J.-M. Devoisselle, F. Babonneau, Implication of water molecules at the silica-ibuprofen interface in silica-based drug delivery systems obtained through incipient wetness impregnation, J. Phys. Chem. C. 121 (2017) 26833-26839; and M. Jahandar Lashaki, A. Sayari, $CO_2$ capture using triamine-grafted SBA-15: The impact of the support pore structure, Chem. Eng. J. 334 (2018) 1260-1269, each incorporated herein by reference in their entirety. Organic functional groups have been immobilized within the framework of SBA-15 via various approaches for the adsorption of different analytes. By the two-step post-grafting method, Junning et al. successfully attached imidazole groups to mesoporous SBA-15 and used it for the extraction of hexavalent chromium from aqueous solution. See J. Li, T. Qi, L. Wang, C. Liu, Y. Zhang, Synthesis and characterization of imidazole-functionalized SBA-15 as an adsorbent of hexavalent chromium, Mater. Lett. 61 (2007) 3197-3200, incorporated herein by reference in its entirety. Various aminosilanes have also been inserted on the framework of SBA-15. The formed adsorbents were used in the adsorption of $CO_2$ both in the presence and in the absence of water vapor. The surface density of amines played a significant role in these adsorption studies. See N. Hiyoshi, K. Yogo, T. Yashima, Adsorption characteristics of carbon dioxide on organically functionalized SBA-15, Microporous Mesoporous Mater. 84 (2005) 357-365, incorporated herein by reference in its entirety. In a study to effectively separate bovine serum albumin protein, 3-amino-propyltriethyoxysilane was attached to SBA-15 via a post-synthesis method. See T. P. B. Nguyen, J.-W. Lee, W. G. Shim, H. Moon, Synthesis of functionalized SBA-15 with ordered large pore size and its adsorption properties of BSA, Microporous Mesoporous Mater. 110 (2008) 560-569, incorporated herein by reference in its entirety. Propylthiols have also been grafted to SBA-15 and were used for size selective adsorption of proteins in another study. See H. H. P. Yiu, C. H. Botting, N. P. Botting, P. A. Wright, Size selective protein adsorption on thiol-functionalised SBA-15 mesoporous molecular sieve, Phys. Chem. Chem. Phys. 3 (2001) 2983-2985, incorporated herein by reference in its entirety.

Specifically, silica-based sorbents have been utilized in extracting phenolic compounds. Xiaoli et al. reported the application of surfactant-modified silica-magnetite nanoparticle-mixed hemimicelle for the removal of phenols by solid phase extraction from water samples. See C. Shalaby, X. Ma, A. Zhou, C. Song, Preparation of organic sulfur adsorbent from coal for adsorption of dibenzothiophene-type compounds in diesel fuel, Energy and Fuels. 23 (2009) 2620-2627, incorporated herein by reference in its entirety. By solid-phase microextraction method, silica fibers bonded to multiwalled carbon nanotubes performed remarkably in the removal of phenols in water samples. See H. Liu, J. Li, X. Liu, S. Jiang, A novel multiwalled carbon nanotubes bonded fused-silica fiber for solid phase microextraction-gas chromatographic analysis of phenols in water samples, Talanta. 78 (2009) 929-935, incorporated herein by reference in its entirety. β-cyclodextrin bonded to silica has also been utilized in the extraction of phenols. See H. Faraji, β-Cyclodextrin-bonded silica particles as the solid-phase extraction medium for the determination of phenol compounds in water samples followed by gas chromatography with flame ionization and mass spectrometry detection, J. Chromatogr. A. 1087 (2005) 283-288; Y. Fan, Y. Q. Feng, S. L. Da, On-line selective solid-phase extraction of 4-nitrophenol with β-cyclodextrin bonded silica, Anal. Chim. Acta. 484 (2003) 145-153; and Y. Hu, Y. Zheng, F. Zhu, G. Li, Sol-gel coated polydimethylsiloxane/beta-cyclodextrin as novel stationary phase for stir bar sorptive extraction and its application to analysis of estrogens and bisphenol A, J. Chromatogr. A. 1148 (2007) 16-22, each incorporated herein by reference in their entirety.

Instead of preparing hybrid materials based on silica as reported above, one purpose of the present disclosure is the direct functionalization of SBA-15 with relatively polar groups such as 1,2,3-triazole and non-polar groups such as a long chain aliphatic group. The formed SBA-15 functionalized sorbent will thus have the blend of both polar and non-polar active sites.

A strategy based on the click reaction of azide functionalized SBA-15 with phenylacetylene was used to develop a new sorbent (4-phenyl-1,2,3-triazole functionalized SBA-15) that has the property of extracting both polar groups (due to the 1,2,3-triazole group) and moderately polar groups (due to the presence of long straight chain alkyl group). See H. C. Kolb, M. G. Finn, K. B. Sharpless, Click chemistry: diverse chemical function from a few good reactions, Angew. Chemie Int. Ed. 40 (2001) 2004-2021, incorporated herein by reference in its entirety. The sorbent was used in stir bar-supported micro-solid-phase extraction (SB-μ-SPE) of both highly polar (2,4-dichlorophenol (24DCP); 2,3-dichlorophenol (23DCP); 2,6-dichlorophenol (26DCP); 2,4,6-trichlorophenol (246TCP)) and moderately polar (2,6-di-tert-butyl-4-m ethyl phenol (26DTB4MP); 4-tert-octylphenol (4tOP); 2-benzyl-4-chlorophenol (2B4CP)) phenols.

The SB-μ-SPE extraction method is an improvement of the micro-solid-phase extraction (μ-SPE). See C. Basheer, A. A. Alnedhary, B. S. M. Rao, S. Valliyaveettil, H. K. Lee, Development and application of porous membrane-protected carbon nanotube micro-solid-phase extraction combined with gas chromatography/mass spectrometry., Anal. Chem. 78 (2006) 2853-8; and M. Sajid, Porous membrane protected micro-solid-phase extraction: A review of features, advancements and applications, Anal. Chim. Acta. In Press, (2017), each incorporated herein by reference in their entirety. In this method, a tiny stir-bar is inserted inside a polypropylene (PP) membrane together with the sorbent and then sealed with a heater. The tiny stir-bar helps to solve the issue of floating of the PP membrane over sample solution or clinging to the side of the sample vial. In addition, it also enhanced the interaction of PP membrane and sample solution through continuous stirring and rotation, which in turn increases the effective surface area of the sorbent provided to the analytes in the sample solution. See M. Sajid, C. Basheer, M. Daud, A. Alsharaa, Evaluation of layered double hydroxide/graphene hybrid as a sorbent in membrane-protected stir-bar supported micro-solid-phase extraction for determination of organochlorine pesticides in urine samples, J. Chromatogr. A. 1489 (2017) 1-8; and M. Sajid, C. Basheer, Stir-bar supported micro-solid-phase extraction for the determination of polychlorinated biphenyl congeners in serum samples, J. Chromatogr. A. 1455 (2016) 37-44, each incorporated herein by reference in their entirety.

In view of the foregoing, one objective of the present invention is to provide a functionalized silica sorbent made of porous silica nanoparticles having a surface functionalized with a conjugated system attached by an alkyl chain of length $C_8$-$C_{16}$ and a method of using the sorbent to adsorb phenolic materials from solution.

BRIEF SUMMARY OF THE INVENTION

According to a first aspect, the present disclosure relates to a functionalized silica sorbent made of porous silica nanoparticles having a surface functionalized with a conjugated system attached by an alkyl chain of length $C_8$-$C_{16}$. The porous silica nanoparticles have an average particle size of 10-80 nm, and the conjugated system comprises an azole group and a phenyl group.

In one embodiment, the porous silica nanoparticles are clustered in agglomerates having an average diameter of 1-4 μm.

In one embodiment, the porous silica nanoparticles have an average pore size in a range of 4-9 nm.

In one embodiment, the porous silica nanoparticles have a BET surface area of 200-380 $m^2/g$.

In one embodiment, the porous silica nanoparticles have a total pore volume in a range of 0.380-0.700 $cm^3/g$.

In one embodiment, the conjugated system consists of a triazole group and a phenyl group.

In one embodiment, the conjugated system is 4-phenyl-1,2,3-triazole.

In one embodiment, the alkyl chain has a length of $C_{10}$-$C_{12}$.

In one embodiment, the functionalized silica sorbent has 3-12 wt % N relative to a total weight of the functionalized silica sorbent.

In one embodiment, the functionalized silica sorbent has 50-58 wt % Si relative to a total weight of the functionalized silica sorbent.

According to a second aspect, the present disclosure relates to a method for producing the functionalized silica sorbent of the first aspect. This involves mixing a silicon alkoxide, an azidoalkyltrialkoxysilane, and a structure directing agent with an acidic solution to produce a reaction mixture. The reaction mixture is heated in an autoclave at 80-120° C. for 18-30 h to produce an azide-functionalized silica. The azide-functionalized silica is mixed with an aqueous solution, a copper salt, and an arylalkyne for 4-24 h to produce the functionalized silica sorbent.

In one embodiment, the azidoalkyltrialkoxysilane is azidoundecyltrimethoxysilane.

In one embodiment, the silicon alkoxide is tetraethyl orthosilicate.

In one embodiment, the structure directing agent is a nonionic block copolymer.

In one embodiment, the copper salt is $CuSO_4$.

According to a third aspect, the present disclosure relates to a method of adsorbing a contaminant from an aqueous solution. This method involves mixing the functionalized silica sorbent of the first aspect in the aqueous solution comprising the contaminant at a concentration of 1-600 ng/mL, where a concentration of the functionalized silica sorbent after mixing is 1-100 mg/mL. At least 85 wt % of the contaminant is adsorbed by the functionalized silica sorbent in 10-25 min relative to a total weight of the contaminant.

In one embodiment, the contaminant is at least one selected from the group consisting of a dichlorophenol, a trichlorophenol, 2,6-di-tert-butyl-4-methylphenol, 4-tert-octylphenol, and a benzyl-chlorophenol.

In one embodiment, the functionalized silica sorbent is confined within a porous membrane bag.

In one embodiment, the aqueous solution further comprises an inorganic salt at a concentration of 0.01-0.2 g/mL.

In one embodiment, the method also involves desorbing the contaminant by sonicating the functionalized silica sorbent in an organic solvent for 15-30 min.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
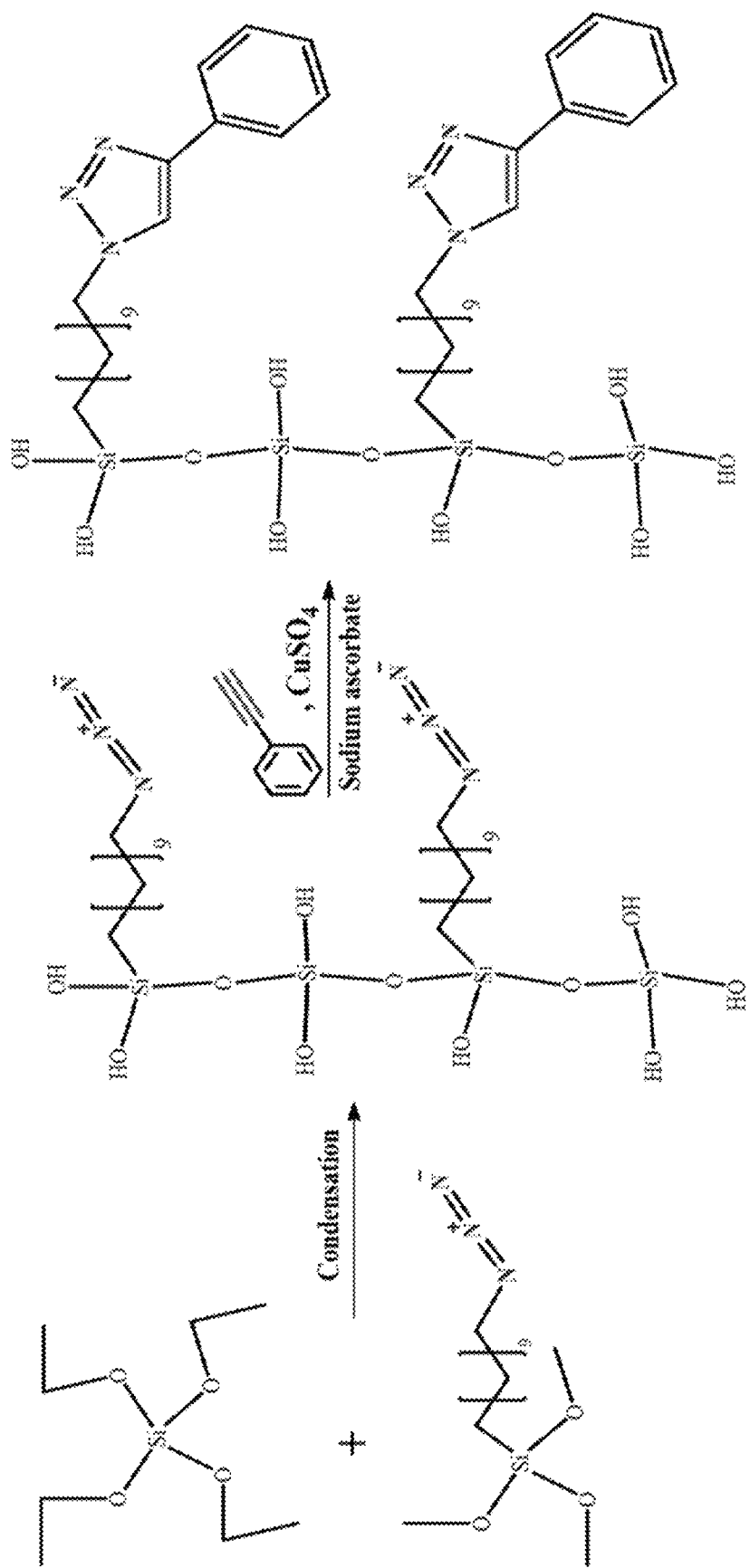
FIG. 1 illustrates the step-by-step synthesis of 4-phenyl-1,2,3-triazole functionalized SBA-15.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/− 0.1% of the stated value (or range of values), +/− 1% of the stated value (or range of values), +/− 2% of the stated value (or range of values), +/− 5% of the stated value (or range of values), +/− 10% of the stated value (or range of values), +/− 15% of the stated value (or range of values), or +/− 20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of silicon include $^{28}Si$, $^{29}Si$, $^{30}Si$, $^{31}Si$, and $^{32}Si$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a functionalized silica sorbent made of porous silica nanoparticles having a surface functionalized with a conjugated system attached by an alkyl chain of length $C_8$-$C_{16}$. As defined here, a "sorbent" is a material used to absorb and/or adsorb one or more compounds. Throughout this disclosure the terms "absorbing a contaminant" and "adsorbing a contaminant" are taken to have equivalent meanings. Additionally, "sorbent" is taken to have the same meaning as "adsorbent" and "absorbent."

In one embodiment, the porous silica nanoparticles have an average particle size of 10-80 nm, 15-50 nm, 18-30 nm, preferably 20-28 nm, more preferably 21-27 nm, or about 23 nm, though in some embodiments, the average particle size may be less than 10 nm or greater than 80 nm.

The porous silica nanoparticles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. In one embodiment, the porous silica nanoparticles may be substantially spherical, meaning that the distance from the particle centroid (center of mass) to anywhere on the nanoparticle outer surface varies by less than 30%, preferably by less than 20%, more preferably by less than 10% of the average di stance.

In one embodiment, the porous silica nanoparticles are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In a preferred embodiment, the porous silica nanoparticles are monodisperse having a particle diameter distribution ranging from 80% of the average particle diameter to 120% of the average particle diameter, preferably 85-115%, preferably 90-110% of the average particle diameter. In another embodiment, the porous silica nanoparticles are not monodisperse In one embodiment, the porous silica nanoparticles are clustered in agglomerates having an average diameter of 1-4 μm, preferably 1.5-3.8 μm, more preferably 2.0-3.5 μm, even more preferably about 3 μm. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. In this embodiment, the primary particles are the porous silica nanoparticles having a mean diameter as previously described.

In one embodiment, the porous silica nanoparticles have an average pore size in a range of 4-9 nm, preferably 5-8 nm, more preferably 6-7 nm, even more preferably about 6.5 nm. However, in some embodiments, the average pore size may be smaller than 4 nm or greater than 9 nm. In one embodiment, the porous silica nanoparticles may be considered mesoporous silica, meaning that the pores have diameters between 2 and 50 nm. In a further embodiment, the porous silica nanoparticles may comprise pores in a hexagonal arrangement. In another further embodiment, the porous silica nanoparticles may be called SBA-15, or functionalized SBA-15. In one embodiment, the porous silica nanoparticles may comprise 60-100 wt % silica, preferably 70-95 wt % silica, relative to a total weight of the porous silica nanoparticles.

In one embodiment, the porous silica nanoparticles have a BET surface area in a range of 200-380 m$^2$/g, preferably 220-330 m$^2$/g, more preferably 230-300 m$^2$/g, even more preferably 250-260 m$^2$/g. In alternative embodiments, the porous silica nanoparticles may have a BET surface area of less than 200 m$^2$/g or greater than 380 m$^2$/g.

In one embodiment, the porous silica nanoparticles have a total pore volume in a range of 0.380-0.700 cm$^3$/g, preferably 0.390-0.600 cm$^3$/g, more preferably 0.400-0.500 cm$^3$/g, though in some embodiments, the porous silica nanoparticles may have a total pore volume of less than 0.380 cm$^3$/g or greater than 0.700 cm$^3$/g.

The surface of the porous silica nanoparticles is functionalized with a conjugated system attached by an alkyl chain of length $C_8$-$C_{16}$, preferably $C_9$-$C_{14}$, more preferably $C_{10}$-$C_{12}$. In one embodiment, the surface is functionalized with a conjugated system attached by an alkyl chain length of $C_{11}$ (i.e. 11 carbons). As defined here, the surface being functionalized with a conjugated system means that the surface, the alkyl chain, and the conjugated system are all connected through covalent bonds, and the "surface" includes interior surfaces within pores.

As used herein, the term "alkyl" unless otherwise specified, refers to both branched and straight chain saturated aliphatic primary, secondary, and/or tertiary hydrocarbons of typically $C_1$ to $C_{16}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term may also include substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, or phosphonate or mixtures thereof. In a preferred embodiment, the conjugated system is attached by an alkyl chain comprising a straight chain of saturated aliphatic secondary hydrocarbons.

As defined here, the conjugated system refers to a system of connected p orbitals with delocalized electrons in a molecule. A conjugated system is conventionally represented as having alternating single and multiple bonds and may be cyclic, acyclic, linear, or mixed. A conjugated system may also comprise electron lone pairs, radicals, or carbenium ions. In one embodiment, the conjugated system comprises one or more aromatic cyclic compounds. In one embodiment, the conjugated system comprises two aromatic cyclic compounds.

In one embodiment, the conjugated system may comprise 1,2,3-triazine, 1,2,4-triazine, 1,3,5-triazine (s-triazine), acridine, annulene, anthracene, azole, benzene, benzimidazole, benzisoxazole, benzo[c]thiophene, benzofuran, benzothiazole, benzothiophene, benzoxazole, cinnoline, furan, imidazole, indazole, indole, isobenzofuran, isoindole, isoquinoline, isoxazole, naphthalene, oxazole, phenanthrene, phenyl, phthalazine, purine, pyrazine, pyrazole, pyridazine, pyridine, pyrimidine, pyrrole, quinazoline, quinoline, quinoxaline, thiazole, thiophene, or some other aromatic group. Preferably the conjugated system comprises an azole group and phenyl group. In one embodiment, the conjugated system consists of an azole group and a phenyl group. In a preferred embodiment, the conjugated system consists of a triazole group and a phenyl group, and in a more preferred embodiment, the conjugated system is 4-phenyl-1,2,3-triazole.

In one embodiment, the functionalized silica sorbent comprises N at a weight percentage of 3-12 wt %, preferably 4-11 wt %, more preferably 5-10 wt %, even more preferably 6-9 wt % relative to a total weight of the functionalized silica sorbent. However, in some alternative embodiments, the functionalized silica sorbent comprises less than 3 wt % or greater than 12 wt % N relative to a total weight of the functionalized silica sorbent.

In one embodiment, the functionalized silica sorbent comprises Si at a weight percentage of 50-58 wt %, preferably 51-56 wt %, more preferably 52-55 wt % relative to a total weight of the functionalized silica sorbent. However, in some alternative embodiments, the functionalized silica sorbent may comprise less than 50 wt % or greater than 58 wt % Si relative to a total weight of the functionalized silica sorbent.

In one embodiment, the functionalized silica sorbent comprises 0 (oxygen) at a weight percentage of 34-45 wt %, preferably 35-41 wt %, more preferably 36-40 wt %, relative to a total weight of the functionalized silica sorbent. However, in some alternative embodiments, the functionalized silica sorbent may comprise less than 34 wt % or greater than 45 wt % O relative to a total weight of the functionalized silica sorbent.

According to a second aspect, the present disclosure relates to a method for producing the functionalized silica sorbent of the first aspect. This involves mixing a silicon alkoxide, an azidoalkyltrialkoxysilane, and a structure directing agent with an acidic solution to produce a reaction mixture. The reaction mixture is heated in an autoclave to produce an azide-functionalized silica. The azide-functionalized silica is mixed with an aqueous solution, a copper salt, and an arylalkyne to produce the functionalized silica sorbent.

In one embodiment, the structure directing agent is a nonionic block copolymer. A block copolymer is a specific type of copolymer made up of blocks of different polymerized monomers. In a block copolymer, a portion of the macromolecule comprising many constitutional units has at least one feature which is not present in the adjacent portions. Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers respectively, tetrablocks, and multiblocks, etc. may also be fabricated. In stereoblock copolymers, a special structure may be formed from one monomer where the distinguishing feature is the tacticity of each block. The structure directing agent may be a block copolymer, a stereoblock copolymer, or mixtures thereof.

In one embodiment, the structure directing agent is a poloxamer. Poloxamers are nonionic triblock copolymers composed of a central hydrophobic chain of polyoxypropylene (poly(propylene oxide), or PPO) flanked by two hydrophilic chains of polyoxyethylene (poly(ethylene oxide), or PEO). Because the lengths of the polymer blocks may be customized, many different poloxamers exist that have slightly different properties. For the generic term poloxamer, these copolymers are commonly named with the letter P (for poloxamer) followed by three digits: the first two digits multiplied by 100 give the approximate molecular mass of the polyoxypropylene core in g/mol, and the last digit multiplied by 10 gives the percentage polyoxyethylene content. In one embodiment, the structure directing agent is P123 poloxamer, which is a symmetric triblock copolymer comprising poly(ethylene oxide) (PEO) and poly(propylene oxide) (PPO) in an alternating linear fashion, PEO-PPO-PEO. The unique characteristic of PPO block, which is hydrophobic at temperatures above 288 K and is soluble in water at temperatures below 288 K, leads to the formation of micelles comprising PEO-PPO-PEO triblock copolymers. The nominal chemical formula of P123 is $HO(CH_2CH_2O)_{20}(CH_2CH(CH_3)O)_{70}(CH_2CH_2O)_{20}H$, which corresponds to a molecular weight of around 5,800 g/mol. P123 poloxamer may be known by the trade name Pluronic® P-123.

In one embodiment, the azidoalkyltrialkoxysilane is an azidoalkyltrimethoxysilane or an azidoalkyltriethoxysilane, though in some embodiments, a mixture of azidoalkyltrimethoxysilanes and azidoalkyltriethoxysilanes may be used. Preferably the azidoalkyltrialkoxysilane is an azidoalkyltrimethoxysilane. In one embodiment, the azidoalkyltrimethoxysilane may be azidomethyltrimethoxysilane, azidoethyltrimethoxysilane, azidopropyltrimethoxysilane, azidobutyltrimethoxysilane, azidopentyltrimethoxysilane, azidohexyltrimethoxysilane, azidoheptyltrimethoxysilane, azidooctyltrimethoxysilane, azidononyltrimethoxysilane, azidodecyltrimethoxysilane, azidoundecyltrimethoxysilane, azidododecyltrimethoxysilane, azidomethyltriethoxysilane, azidoethyltriethoxysilane, azidopropyltriethoxysilane, azidobutyltriethoxysilane, azidopentyltriethoxysilane, azidohexyltriethoxysilane, azidoheptyltriethoxysilane, azidooctyltriethoxysilane, azidononyltriethoxysilane, azidodecyltriethoxysilane, azidoundecyltriethoxysilane, and/or azidododecyltriethoxysilane. In a preferred embodiment, the azidoalkyltrialkoxysilane is azidoundecyltrimethoxysilane.

In one embodiment, the silicon alkoxide is tetraethyl orthosilicate, tetramethyl orthosilicate, tetrapropyl orthosilicate, and/or tetrabutyl orthosilicate. In a preferred embodiment, the silicon alkoxide is tetraethyl orthosilicate (TEOS).

The silicon alkoxide, azidoalkyltrialkoxysilane, and structure directing agent are mixed with an acidic solution to produce a reaction mixture. The acidic solution may comprise 9-17 wt %, preferably 10-16 wt %, more preferably 11-15 wt % acid relative to the total weight of the acidic solution, with the remaining weight percentage comprising water, preferably deionized or distilled water. The acid may be formic acid, benzoic acid, acetic acid, phosphoric acid, hydrobromic acid, hydroiodic acid, nitric acid, hydrochloric acid, hydrofluoric acid, sulfuric acid, and/or perchloric acid or some other acid. Preferably the acid is nitric acid, hydrochloric acid, hydrofluoric acid, sulfuric acid, and/or perchloric acid; more preferably the acid is hydrochloric acid. The reaction mixture may comprise the acidic solution at a weight percentage of 85-97 wt %, preferably 87-95 wt %, more preferably 89-94 wt %, relative to a total weight of the reaction mixture. The reaction mixture may comprise the structure directing agent at a weight percentage of 0.5-5.0 wt %, preferably 1.0-4.5 wt %, relative to a total weight of the reaction mixture. The silicon alkoxide and the azidoalkyltrialkoxysilane may have a combined weight that is 3-8 wt %, preferably 4-7 wt % of the total weight of the reaction mixture. More specifically, the azidoalkyltrialkoxysilane may be present in the reaction mixture at a weight percentage of 1-15 wt %, preferably 2-12 wt % relative to a total weight of the reaction mixture, or about 2 wt %, or about 5 wt %, or more preferably about 10 wt %.

Prior to any heating, the reaction mixture may be stirred for 1-48 h, preferably 6-24 h, more preferably 12-20 h. In one embodiment, the reaction mixture is heated in an autoclave at 80-120° C., preferably 82-110° C., more preferably 85-100° C., or about 90° C. for 18-30 h, preferably 20-28 h, more preferably 22-26 h to produce an azide-functionalized silica, by means of a condensation reaction between the silicon alkoxide and the azidoalkyltrialkoxysilane. The azide-functionalized silica may be in the form of mesoporous nanoparticles. The azide-functionalized silica may be dried, for instance, in an oven at 80-120° C., preferably 85-105° C., for 3-24 h, preferably 6-18 h, or 8-12 h. In one embodiment, to remove the structure directing agent, the dried azide-functionalized silica may be sonicated or mixed in a solvent comprising water, methanol, ethanol, and/or isopropanol for 2-10 h, preferably 4-8 h, and then removed and dried at 80-120° C., preferably 85-105° C., for 3-24 h, preferably 12-20 h.

The azide-functionalized silica is mixed with an aqueous solution, a copper salt, and an arylalkyne to produce the functionalized silica sorbent. The aqueous solution, copper salt, and arylalkyne may be added together and mixed for 6-24 h, preferably 8-22 h, more preferably 12-20 h, or overnight. In one embodiment, the aqueous solution comprises 30-70 vol % of an alcohol, preferably 40-60 vol %, more preferably about 50 vol %, and 30-70 vol % of water, preferably 40-60 vol % water, more preferably about 50 vol %, relative to a total volume of the aqueous solution. In one embodiment, the aqueous solution further comprises a reducing agent, such as sodium ascorbate, some other ascorbate salt, sodium citrate, sodium borohydride, sodium hypophosphite, or hydrazine, or some other reducing agent. The reducing agent may be present at a weight percentage of 0.001-0.01 wt %, 0.01-0.05 wt %, 0.05-0.1 wt %, 0.1-10 wt %, 0.5-8 wt %, 0.8-5 wt %, 1.0-4.5 wt %, or 1.5-4.0 wt %, relative to a total weight of the aqueous solution.

The copper salt and the arylalkyne may be added to an amount that approximates or is a 1:1 molar ratio with the number of azide groups in the azide-functionalized silica. For instance, an amount of the copper salt may be added so that a molar ratio of the copper salt to the azide groups is in a range of 1:1.1-1.1:1, preferably 1:1.05-1.05:1. An amount of the arylalkyne added may have a molar ratio with azide groups in a range of 1:1.1-1.1:1, preferably 1:1.05-1.05:1.

In one embodiment, the copper salt may be $Cu(BF_4)_2$, $CuBr_2$, $CuC_2$, $CuCO_3$, $Cu(CN)_2$, $Cu(ClO_3)_2$, $CuCl_2$, $CuF_2$, $Cu(NO_3)_2$, $Cu_3(PO_4)_2$, $CuN_6$, $CuO$, $CUO_2$, $Cu(OH)_2$, $CuI_2$, $CuS$, $CuSO_4$, $Cu_3(AsO_4)_2$, $CuBr$, $CuCN$, $CuCl$, $CuF$, $CuH$, $CuI$, $Cu_2C_2$, $Cu_2Cr_2O_5$, $Cu_2O$, $CuOH$, $CuNO_3$, $Cu_3P$, $Cu_2S$, $CuSCN$, and/or $Cu_3H_4O_8S_2$. Preferably, the copper salt is $CuSO_4$.

In one embodiment, the arylalkyne may be phenyl acetylene, tolyl acetylene, xylyl acetylene, or naphthyl acetylene.

In one embodiment, the mixing of the azide-functionalized silica with the other components forms the functionalized silica sorbent by a Cu catalyzed click reaction. More specifically, this may be known as an azide-alkyne Huisgen cycloaddition, which is a 1,3-dipolar cycloaddition between an azide and a terminal or internal alkyne to give a 1,2,3-triazole. The formed functionalized silica sorbent may be washed with methanol, ethanol, isopropanol, or water to remove remaining copper compounds.

According to a third aspect, the present disclosure relates to a method of adsorbing a contaminant from an aqueous solution. This method involves mixing the functionalized silica sorbent of the first aspect in the aqueous solution. After the mixing, the functionalized silica sorbent may be present in the aqueous solution at a mass to volume ratio (mass sorbent to volume aqueous solution) of 1-100 mg/mL, preferably 2-80 mg/mL, more preferably 10-50 mg/mL, even more preferably 20-30 mg/mL. In some embodiments, prior to mixing the functionalized silica sorbent with the aqueous solution, the functionalized silica sorbent may be conditioned by sonicating in an organic solvent, such as toluene or chloroform, for a period of 1-15 min, preferably 3-10 min.

In one embodiment, the aqueous solution may come from a body of water such as an ocean, a bay, a river, a spring, a lake, a swamp, or a pond or alternatively, from a treated artificial body of water, such as a pool, fountain, bath, aquarium, or hot tub. The sample may also be water taken from other natural environments such as groundwater (such as a well or an aquifer), rainwater, dew, fog, hot spring, a steam vent, snow, ice, or a geyser. In other embodiments, the aqueous solution may come from processed water or wastewater of industrial process including but not limited to a water treatment plant, a sewage treatment plant, a desalination plant, a manufacturing plant, a chemical plant, a textile plant, a power plant, a gas station, a food processing plant (such as milk, fruit juice, or honey), a restaurant, a dry cleaner, or some other place that may be a source of contaminated water mixtures. In other embodiments, the aqueous solution may be prepared in a laboratory or pilot plant for the purpose of testing removal of contaminants.

In an alternative embodiment, a contaminant may be confined within a solid sample, for instance, a sample of biological origin, such as vegetative matter, bacteria, or animal tissue. Here, a solid sample may be processed in a solution in order to release the contaminant into the aqueous solution. This processing may lyse the cells of a biological sample, and may comprise sonication, microwaving, heating, extrusion, grinding, liquid homogenization, blending, scraping, slicing, centrifuging, drying, osmotic shock, and/or freeze-thawing.

The aqueous solution may comprise the contaminant at a concentration of 1-600 ng/mL, preferably 100-500 ng/mL, more preferably 150-450 ng/mL. In other embodiments, the contaminant may be present at a concentration of less than 1 ng/mL or greater than 600 ng/mL.

In one embodiment, the contaminant may be an herbicide, a dye, a fungicide, a pesticide, a drug, a steroid, a microbial toxin, a metabolite, a disinfection byproduct, a phenol compound, or some other small organic molecule. Disinfection byproducts may include iodoacetic acid, N-nitrosodimethylamine (NDMA), nitrogentrichloride, chloramine, halonitromethanes, haloacetonitriles, haloamides, halofuranones, nitrosamines, trihalomethanes, and haloketones. Phenol compounds include salicylic acid, monochlorophenol, dichlorophenol, trichlorophenol, 2,6-di-tert-butyl-4-methylphenol (26DTB4MP), 4-tert-octylphenol (4tOP), and benzyl-chlorophenol. More specifically, monochlorophenol includes 2-chlorophenol, 3-chlorophenol, and 4-chlorophenol. Dichlorophenol includes 2,4-dichlorophenol (24DCP), 2,3-dichlorophenol (23DCP), 2,5-dichlorophenol (25DCP), 2,6-dichlorophenol (26DCP), 3,4-dichlorophenol (34DCP), and 3,5-dichlorophenol (35DCP). Trichlorophenol includes 2,3,4-trichlorophenol (234TCP), 2,3,5-trichlorophenol (235TCP), 2,3,6-trichlorophenol (236TCP), 2,4,5-trichlorophenol (245TCP), 2,4,6-trichlorophenol (246TCP), and 3,4,5-trichlorophenol (345TCP). Benzyl-chlorophenol includes 2-benzyl-4-chlorophenol (2B4CP). The contaminant may be other phenol compounds, such as other organohalides of phenol not previously mentioned. Preferably the contaminant is one or more phenol compounds.

In one embodiment, the aqueous solution further comprises an inorganic salt at a concentration of 0.01-0.2 g/mL, preferably 0.02-0.15 g/mL, more preferably 0.03-0.10 g/mL. In alternative embodiments, the aqueous solution may comprise the inorganic salt at a concentration of less than 0.05 g/mL or greater than 0.2 g/mL. The inorganic salt may be NaCl, KCl, LiCl, NaBr, KBr, LiBr, $NaNO_3$, $KNO_3$, $LiNO_3$, or some other inorganic salt. Preferably the inorganic salt is NaCl.

In one embodiment, the functionalized silica sorbent is confined within a porous membrane bag. A single porous membrane bag may confine In one embodiment, the porous membrane of the porous membrane bag may comprise a polymer such as polypropylene, polyethylene, nylon, polyvinylidene fluoride, or polyethersulfone, preferably polypropylene or polyethylene, even more preferably polypropylene. In an alternative embodiment, more than one polymer may comprise the porous membrane. For example, the porous membrane may be composed of both polypropylene and polyethylene with a polypropylene to polyethylene weight ratio range of 1:10-10:1, preferably 1:5-5:1, more preferably 1:2-2:1.

In one embodiment, the porous membrane has a wall thickness of 10-400 µm, preferably 50-300 µm, more preferably 100-200 µm. The porous membrane may have a pore diameter of 0.04-0.80 µm, preferably 0.1-0.5 µm, more preferably 0.1-0.4 µm. The membrane may have a porosity of 40-90 vol %, preferably 50-85 vol %, more preferably 60-80 vol %. The aqueous solution may fill 70-100%, preferably 80-100%, more preferably 90-100% of the pores exposed to the aqueous solution from the interior of the membrane bag. The porous membrane bag may comprise more than one piece of membrane, for instance, the bag may comprise both an inner and outer membrane layer. Where the bag comprises more than one membrane, the membranes may be made of identical material. Alternatively, the membranes may be made of different material, have different thicknesses, and/or have different pore sizes.

The porous membrane bag may comprise a membrane in the shape of a tube, for example, a hollow fiber membrane, where the ends of the tube are closed in order to contain the functionalized silica sorbent. The edges may be closed by an adhesive, a clamp, a tie, or by heat sealing. Alternatively, the membrane may form a balloon shape around the functionalized silica sorbent, with the membrane closed at one side, or with the membrane edges tied at one point. Alternatively, the membrane bag may form a rectangular pillow shape around the functionalized silica sorbent. In this embodiment, the four edges may be sealed along each edge, or one edge may be a fold in the membrane with the remaining edges being sealed along each edge. In this pillow shape, the edges may measure 1-5 cm, preferably 2-4 cm, more preferably 2.2-3 cm in length, and the height may be 0.4-5 cm, preferably 0.8-4 cm, more preferably 0.8-2.8 cm.

In one embodiment, the porous membrane bag may also confine a magnetic stir bar, for instance, a stir bar having a length of 4-10 mm, preferably 5-8 mm, and a width of 1-4 mm, preferably 1.2-2.5 mm. In other embodiments, the porous membrane bag may be attached to a string for ease of handling. However, in alternative embodiments, the functionalized silica sorbent may not be confined within a porous membrane bag, but instead may be removed from the aqueous solution by filtering, or centrifuging and decanting. In one embodiment, during the mixing, the aqueous solution may be kept at room temperature or heated to 30-60° C., preferably 32-40° C., or the aqueous solution may be cooled below room temperature, for instance, to 10-15° C.

Following mixing the functionalized silica sorbent in the aqueous solution comprising the contaminant, at least 70 wt %, at least 75 wt %, at least 85 wt %, at least 90 wt %, or at least 95 wt % of the contaminant, relative to a total weight of the contaminant, is adsorbed by the functionalized silica sorbent in a time period of 5-60 min, preferably 8-30 min, more preferably 10-25 min, even more preferably 15-20 min, or about 15 min. Preferably, with or without a magnetic stir bar, the functionalized silica sorbent and the aqueous solution are stirred or agitated over that time period of adsorption. In some embodiments, the functionalized silica sorbent and aqueous solution may be stirred or agitated much longer, for instance 10-24 h, or 12-18 h. The functionalized silica sorbent and aqueous solution may be stirred or agitated at a rate of 100-1,400 rpm, preferably 300-1,200 rpm.

In one embodiment, after the adsorbing, the functionalized silica sorbent (including a porous membrane bag, if present) is removed from the aqueous solution, rinsed with ethanol, methanol, and/or water, and dried at room temperature.

In one embodiment, the method also involves desorbing the contaminant by sonicating the functionalized silica sorbent with the adsorbed contaminant in an organic solvent for 15-30 min, preferably 17-28 min, more preferably 18-22 min. The sonicating may involve inserting a probe tip sonicator into the organic solvent, or by placing a vessel, vial, or tube holding the functionalized silica sorbent and the organic solvent into a bath sonicator. The organic solvent may be methanol, acetone, chloroform, methylene chloride, ethylacetate, and/or isopropanol. Preferably the organic solvent is ethylacetate and/or methanol, more preferably ethylacetate. In one embodiment, the functionalized silica sorbent with the adsorbed contaminant is present in the organic solvent at a concentration of 0.01-1.0 mg/μL, preferably 0.05-0.5 mg/μL, or about 0.1 mg/μL.

In one embodiment, the method also involves detecting a desorbed contaminant released into the organic solvent. The organic solvent and desorbed contaminant may be fed to a gas chromatograph-mass spectrometer (GCMS) to detect and/or quantify the contaminant.

In one embodiment, a typical commercial GCMS may be used. The carrier gas may be nitrogen, helium, and/or hydrogen. Preferably the carrier gas is helium with a purity of greater than 99.9 mol %, preferably greater than 99.99 mol %, more preferably greater than 99.999 mol %. The stationary phase of the gas chromatography column may be comprised of a methyl siloxane (also known as methyl polysiloxane or dimethyl polysiloxane), phenyl polysiloxane, dimethyl arylene siloxane, cyanopropylmethyl polysiloxane, and/or trifluoropropylmethyl polysiloxane with a film thickness of 0.10-7 μm, preferably 0.15-1 μm, more preferably 0.2-0.5 μm. The column length may be 10-120 m, preferably 15-50 m, more preferably 25-40 m, with an inside diameter of 0.08-0.60 mm, preferably 0.15-0.40 mm, more preferably 0.20-0.30 mm.

The parameters of a GCMS instrument and method of operation, including but not limited to flow rate, temperature, temperature gradient, run time, pressure, sample injection, sample volume, ionization method, ionization energy, and scanning range may be adjusted by a person of ordinary skill in the art to account for differences in samples, equipment, and techniques.

The contaminant may be detected by monitoring a known elution time and/or m/z (mass to charge ratio) for a positive signal as compared with a blank sample or with a control sample. The contaminant may be quantified with a standard addition of an internal standard. For quantitation, known concentrations of an internal standard may be added to a sample that is divided into aliquots. These aliquots are each extracted and measured by GCMS. The linear response of the mass spectrometer counts per concentration of a standard may be extrapolated to quantify a contaminant. Alternatively, standards may be used to calibrate a GCMS prior to analyzing extracted samples, for instance, by using aliquots of known concentrations to construct a calibration curve.

In an alternative embodiment, gas chromatography may be used for detection and/or quantitation of a contaminant without using mass spectrometry. In a related embodiment, the linear trend of the peak areas of the gas chromatogram may be used for quantitation. Generally, a person of ordinary skill in the art may be able to determine the procedure and calculations to quantify and/or detect a contaminant based on GCMS data.

In one embodiment, the contaminant is dichlorophenol, trichlorophenol, 2,6-di-tert-butyl-4-methylphenol (26DTB4MP), 4-tert-octylphenol (4tOP), and/or benzylchlorophenol and may be detected and/or quantified in the range of 0.02-800 ng, preferably 0.5-700 ng, more preferably 1-600 ng per mL aqueous solution. A limit of detection (LOD) of the contaminant in the aqueous solution may be 0.05-0.50 ng/mL, preferably 0.10-0.40 ng/mL, more preferably 0.20-0.35 ng/mL, where the LOD is determined with a signal-to-noise ratio of 3 (S/N=3).

The examples below are intended to further illustrate protocols for preparing, characterizing the functionalized silica sorbent, and uses thereof, and are not intended to limit the scope of the claims.

EXAMPLE 1

Methods and Materials

Chemicals and Materials

All the tested phenols standards were ordered from SUPELCO Analytical, Germany. The 11-azidoundecyltrimethoxysilane was purchased from Gelest, Inc., USA. Tetraethyl orthosilicate reagent grade, 98% (TEOS), pluronic P123, copper (ii) sulfate, sodium ascorbate, and phenylacetylene were procured from Merck KGaA. PP sheet membrane (pore size of 0.2 μm, 157 μm thickness) was purchased from Membrana (Wuppertal, Germany). High purity-analytical grade solvents (methanol, ethanol, acetone, n-hexane, cyclohexane, dichloromethane, and carbon tetrachloride) were ordered from Fisher (Loughborough, UK).

Preparation of Sorbents

Synthesis of SBA-15

Mesoporous SBA-15 silica was synthesized following a previously reported procedure by Zhao et al. See D. Zhao, J. Feng, Q. Huo, N. Melosh, G. H. Fredrickson, B. F. Chmelka, G. D. Stucky, Triblock copolymer syntheses of mesoporous silica with periodic 50 to 300 angstrom pores, Science. 279 (1998) 548-52, incorporated herein by reference in its entirety. Concisely, pluronic P123 surfactant (2 g) was dissolved in a mixture of 10.3 mL concentrated HCl and 65 mL deionized water at 40° C. After complete dissolution, 4.25 mL TEOS was added and the solution was stirred for 18 h to form the supposedly white solution of silica. The silica solution was then transferred into a Teflon® autoclave, and inserted into a synthesis oven at 90° C. for an additional 24 h before centrifuging and drying at 100° C. for 10 h. The dried powder was dispersed in ethanol and sonicated at 65° C. for 6 h to remove the template, thus forming the mesoporous SBA-15 after drying at 100° C. overnight.

Synthesis of Azide Functionalized SBA-15

A sequence of azide functionalized SBA-15 at varying azide weight percent loading (2, 5, and 10 wt %) were prepared following the procedure of SBA-15 synthesis with modifications. The calculated amount of 11-azidoundecyltrimethoxysilane was added dropwise to the acidic solution containing pluronic P123 and TEOS, and the stirring was continued for 18 h before transferring the solution into an autoclave for hydrothermal synthesis at 90° C. for 24 h. After removing the template, the azide functionalized product was denoted $xN_3$-SBA-15, where "x" equals the azide weight percent.

Synthesis of 4-phenyl-1,2,3-triazole Functionalized SBA-15

After template removal in the azide functionalized SBA-15, the powder was re-dispersed in a 1:1 mixture of 12 mL water and ethanol, followed by the addition of a stoichiometric amount of phenylacetylene, sodium ascorbate solution, and copper (ii) sulfate solution, and stirring overnight. Click reaction occurred to form the 4-phenyl-1,2,3-triazole functionalized SBA-15 product. The product was washed with ethanol and deionized water several times to ensure that copper residue has been completely removed. ICP-MS analysis was carried out on the formed product to check for trace amounts of copper. The final product was denoted $xN_3$-Ph-SBA-15, where "$N_3$-Ph" denotes the 4-phenyl-1,2,3-triazole. The synthesis strategy is been presented in FIG. 1.

Characterization

Proton and carbon-13 magic angle spinning (MAS) solid-state NMR of the synthesized $10N_3$-Ph-SBA-15 sorbent was measured using a Bruker AVANCE III 400 MHz wide-bore spectrometer. The surface area and pore size/pore volume of the synthesized sorbents was measured on a micromeritics ASAP 2020 using $N_2$ adsorption-desorption at −196° C. The samples were degassed prior to measurement at 100° C. for 6 h to remove impurities. Morphology of sorbents were recorded on a Field Emission Scanning Electron Microscope FESEM (TESCAN, LYRA 3), and the samples' elemental composition was determined using an energy dispersive X-ray spectrometer (EDS, Oxford Inc.) detector. Fourier Transform Infra-ray (FTIR) spectra of sorbents were measured on a Thermo Scientific NICOLET 6700 spectrometer model. The samples were prepared in the form of a tiny pellet by mixing small amounts of sorbent with KBr powder and then inserted in the sample holder, before recording the absorbance within a scanning range of 400-4000 $cm^{-1}$.

SB-μ-SPE Procedure and Analysis

Development of the SB-μ-SPE device is a simple procedure where a small stir-bar (typically 7 mm×2 mm) and an advantageous amount of sorbent (20 mg) were heat sealed inside a PP sheet bag. Proper sealing must be ensured to avoid leaking of the SB-μ-SPE device during the extraction process. Prior to extraction, the device is conditioned via sonication in toluene for 5 min. After conditioning, the device is inserted in a glass vial containing the sample solution and 0.5 g sodium chloride, and stirred at 600 rpm for 15 min. Later, the device is taken out, rinsed with water, and dried using lint-free tissue. The device is then inserted into a microcentrifuge vial along with 300 μL ethyl acetate as a desorption solvent and sonicated for 20 min. After desorption, the solvent is removed and injected into GC-MS for analysis.

Each step of the extraction process was analyzed while keeping the analyte concentration at 200 ng $mL^{-1}$ in the deionized water. The experiments were conducted in triplicates where peak area was considered as a quantifying parameter for the analysis. The analyzed parameters include type of sorbent and its dosage; extraction time; desorption solvent type and its volume, desorption time; and ionic strength.

GC-MS Configuration and Conditions

The GC-MS configuration and conditions for separation and quantification of target phenols is similar to the set conditions in a recently published work. See K. Alhooshani, Determination of nitrosamines in skin care cosmetics using Ce-SBA-15 based stir bar-supported micro-solid-phase extraction coupled with gas chromatography mass spectrometry, Arab. J. Chem. (2018), doi: 10.1016/j.arabjc.2018.06.004, incorporated herein by reference in its entirety. The oven temperature was programmed thus: an initial temperature of 35° C. was held for 2 min, then ramped at 5° C. $min^{-1}$ to 230° C. before holding it at 230° C. for 5 min. A 1.0 μL sample was injected using splitless mode. For the identification of the peaks of the analytes, scan mode was run, and retention times were confirmed. The selective ion monitoring mode (SIM) was utilized for quantitative analysis by selecting the ions of the respective phenols as shown in Table 1.

TABLE 1

Target compounds, their retention time and selected target ions for SIM mode

| Retention time (min) | Target compounds | Abbreviation | Selected target ions |
|---|---|---|---|
| 15.304 | 2,4-Dichlorophenol | 24DCP | 63, 98, 162 |
| 15.542 | 2,3-Dichlorophenol | 23DCP | 63, 126, 164 |
| 16.289 | 2,6-Dichlorophenol | 26DCP | 63, 98, 162 |
| 20.397 | 2,4,6-Trichlorophenol | 246TCP | 97, 132, 196, 198 |
| 24.54 | 2,6-di-tert-butyl-4-methylphenol | 26DTB4MP | 57, 265, 206, 220 |
| 26.645 | 4-tert-Octylphenol | 4tOP | 52, 107, 135, 136 |
| 32.859 | 2-Benzyl-4-chlorophenyl | 2B4CP | 140, 165, 183, 218 |

Analytical Parameters and Real Sample Analysis

Under the tested experimental settings, the technique was assessed by determining linearity, LODs, repeatability, and relative recoveries. A 6-point calibration curve was developed for plotting all target analytes by using ultrapure water samples spiked with known concentrations (1, 50, 100, 200, 400, and 600 ng $mL^{-1}$) of phenols. LODs were calculated using signal to noise ratio method (S/N=3). To evaluate the reproducibility of the analysis, three concentrations (1, 100, and 400 ng $mL^{-1}$) were selected from the linear range of the analyte. For each concentration, seven (7) trials were conducted.

The established method was applied in the analysis of phenols in wastewater samples. For real sample analysis, 10 mL unspiked real sample was extracted using $10N_3$-Ph-SBA-15 packed in SB-μ-SPE device and analyzed using GC-MS method. Real sample analysis was also tested by spiking three concentrations (1, 100, 400 ng $mL^{-1}$) to the wastewater matrix. Relative recoveries were also tested in the wastewater.

EXAMPLE 2

Results and Discussion

Characterization of 4-phenyl-1,2,3-triazole Functionalized SBA-15

Figure 2A:
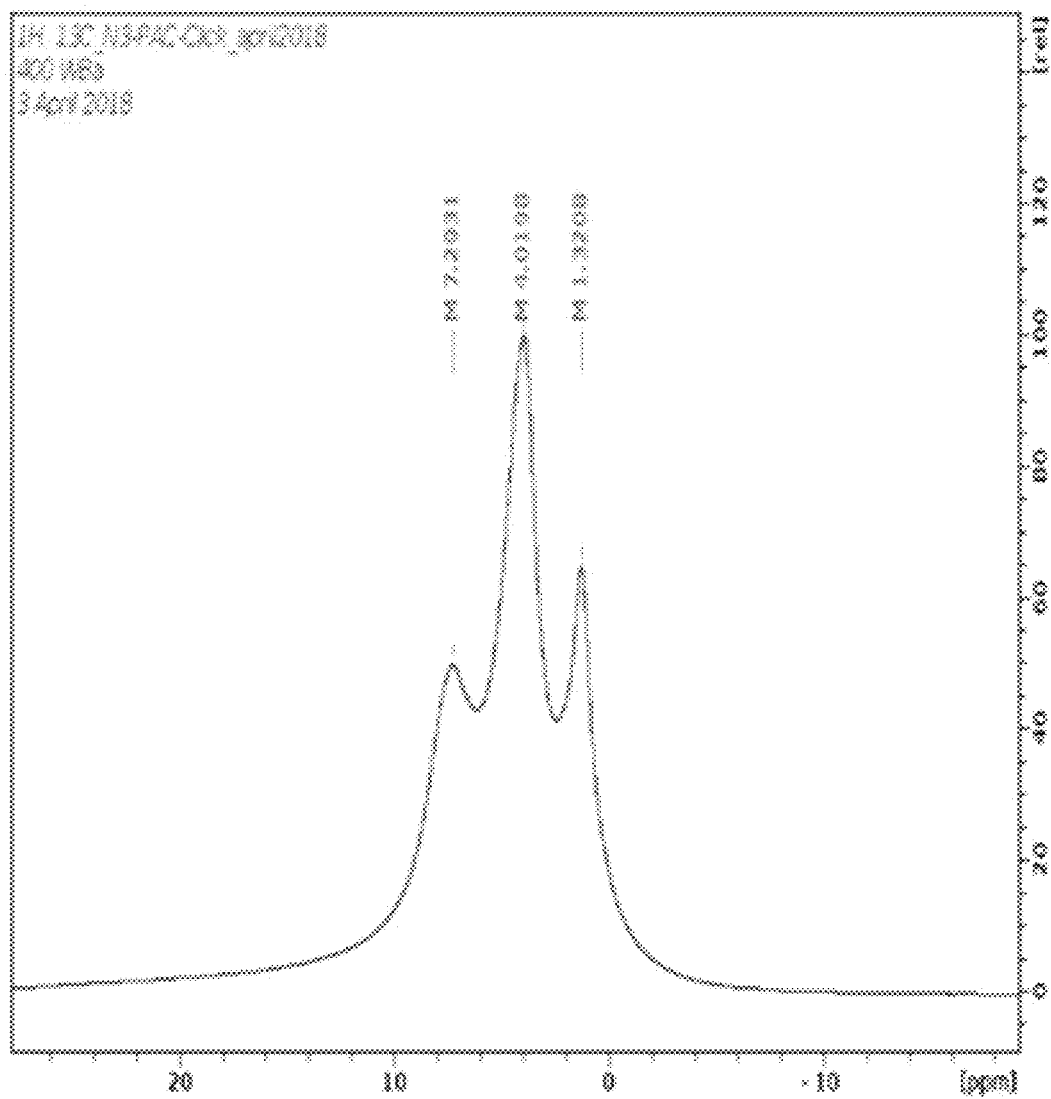
FIG. 2A shows the 400 MHz proton MAS NMR spectrum of 4-phenyl-1,2,3-triazole functionalized SBA-15 at ambient temperature.
Figure 2B:
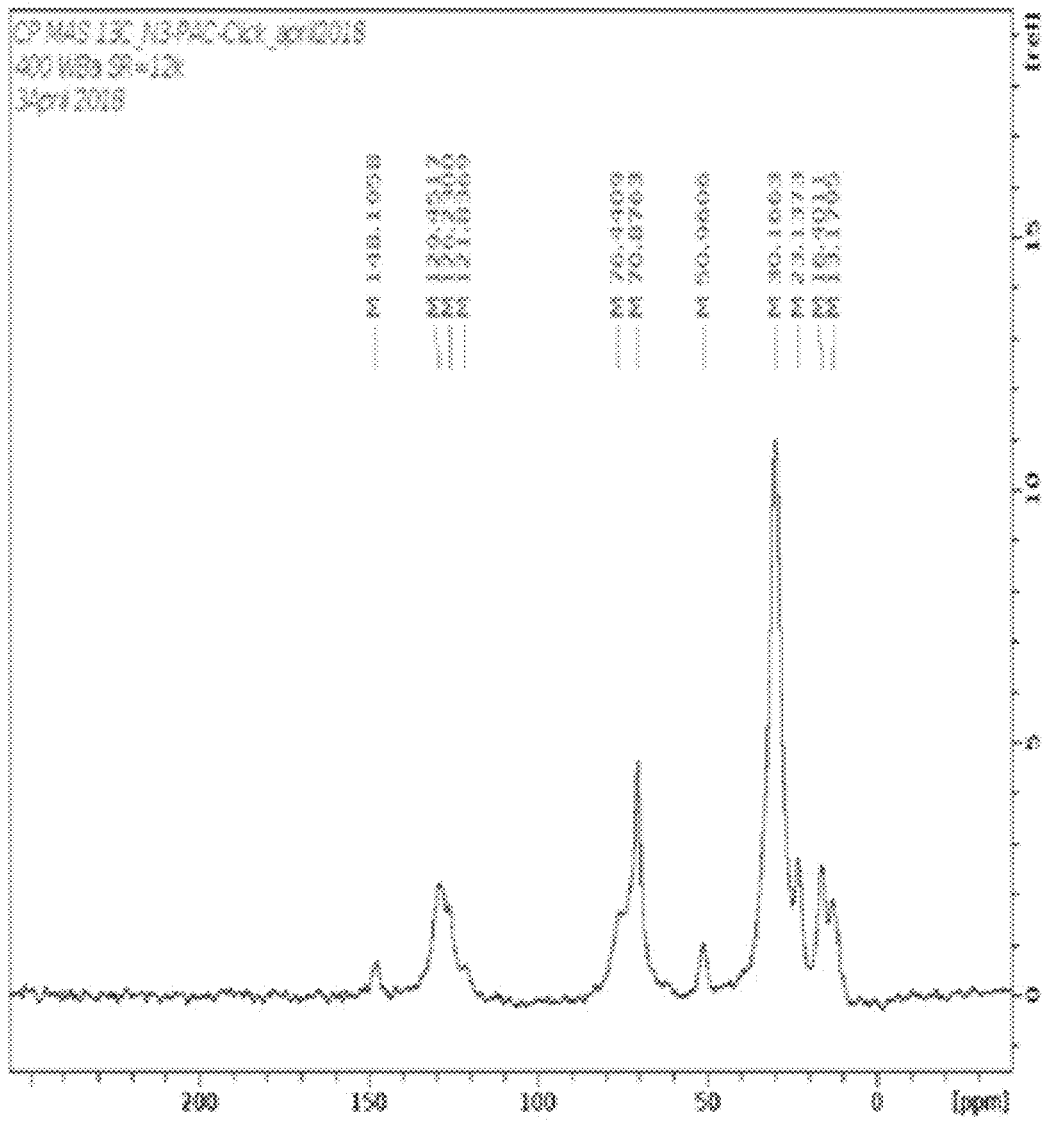
FIG. 2B shows the $^{13}C$ CP MAS NMR spectrum of 4-phenyl-1,2,3-triazole functionalized SBA-15 at ambient temperature.

The $^1H$ MAS NMR of $10N_3$-Ph-SBA-15 shows three peaks at 1.32 ppm, 4.02 ppm, and 7.29 ppm (FIG. 2A). The peak at 1.32 ppm is assigned to the methylene groups attached to the silica on one side and to the nitrogen of 1,2,3-triazole on the other side. The peak at 4.02 ppm is due to the silanol group attached to the framework of the SBA-15, and the peak at 7.29 ppm represents the three magnetically inequivalent phenyl protons. See V. B. Kazansky, A. I. Serykh, V. Semmer-Herledan, J. Fraissard, Intensities of OH IR stretching bands as a measure of the intrinsic acidity of bridging hydroxyl groups in zeolites, Phys. Chem. Chem. Phys. 5 (2003) 966-969, incorporated herein by reference in its entirety. The observed peaks at 129.45 ppm and 148.20 ppm in the $^{13}$C cross polarization MAS NMR of the sorbent shown in FIG. 2B confirm the formation of the click reaction of the azide functionalized SBA-15 and phenylacetylene, respectively. See X. Creary, A. Anderson, C. Brophy, F. Crowell, Z. Funk, Method for assigning structure of 1,2,3-Triazoles, J. Org. Chem. 77 (2012) 8756-8761, incorporated herein by reference in its entirety. The other peaks are due to the methylene carbons and remaining surfactants, which were not removed by the sonication treatment.

Figure 3A:
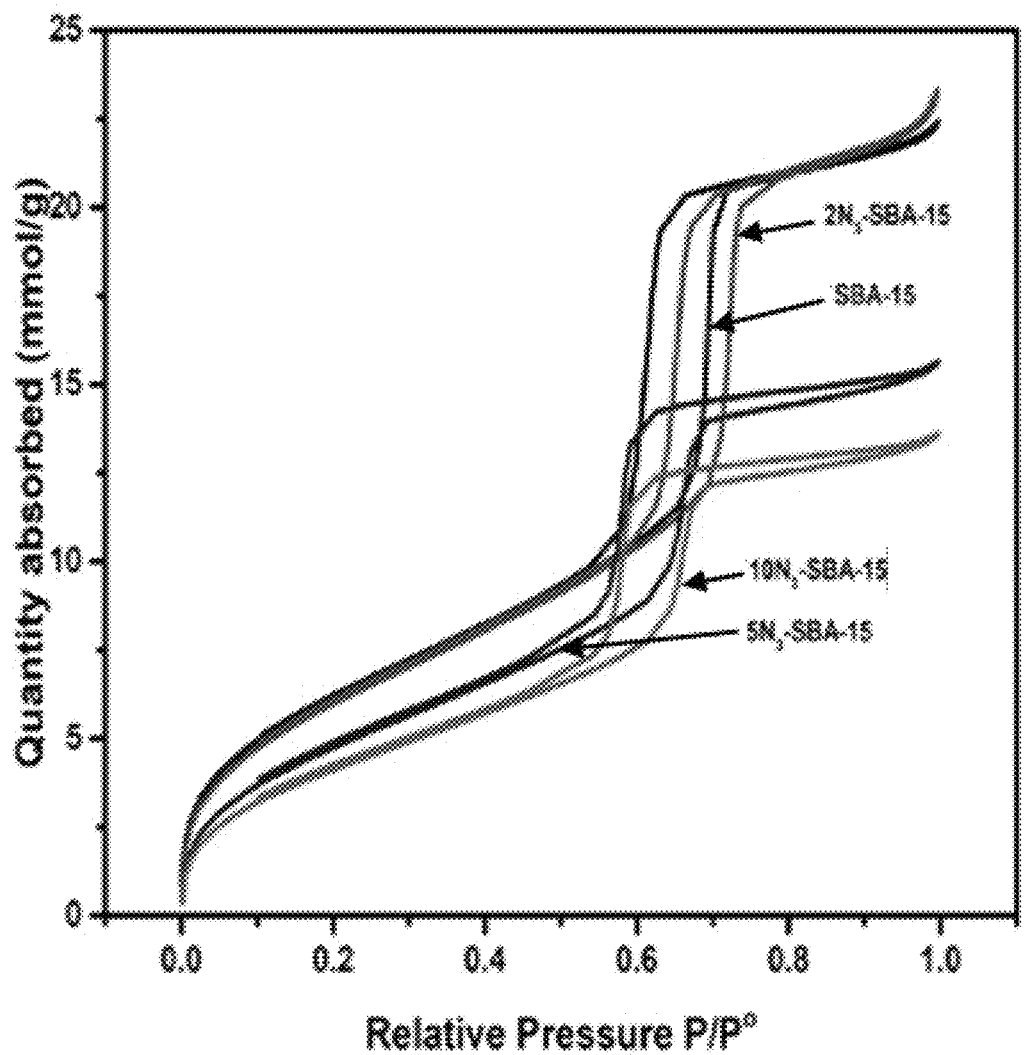
FIG. 3A is the $N_2$-adsorption desorption isotherm of the $xN_3$-SBA-15 adsorbents showing a type IV isotherm.
Figure 3B:
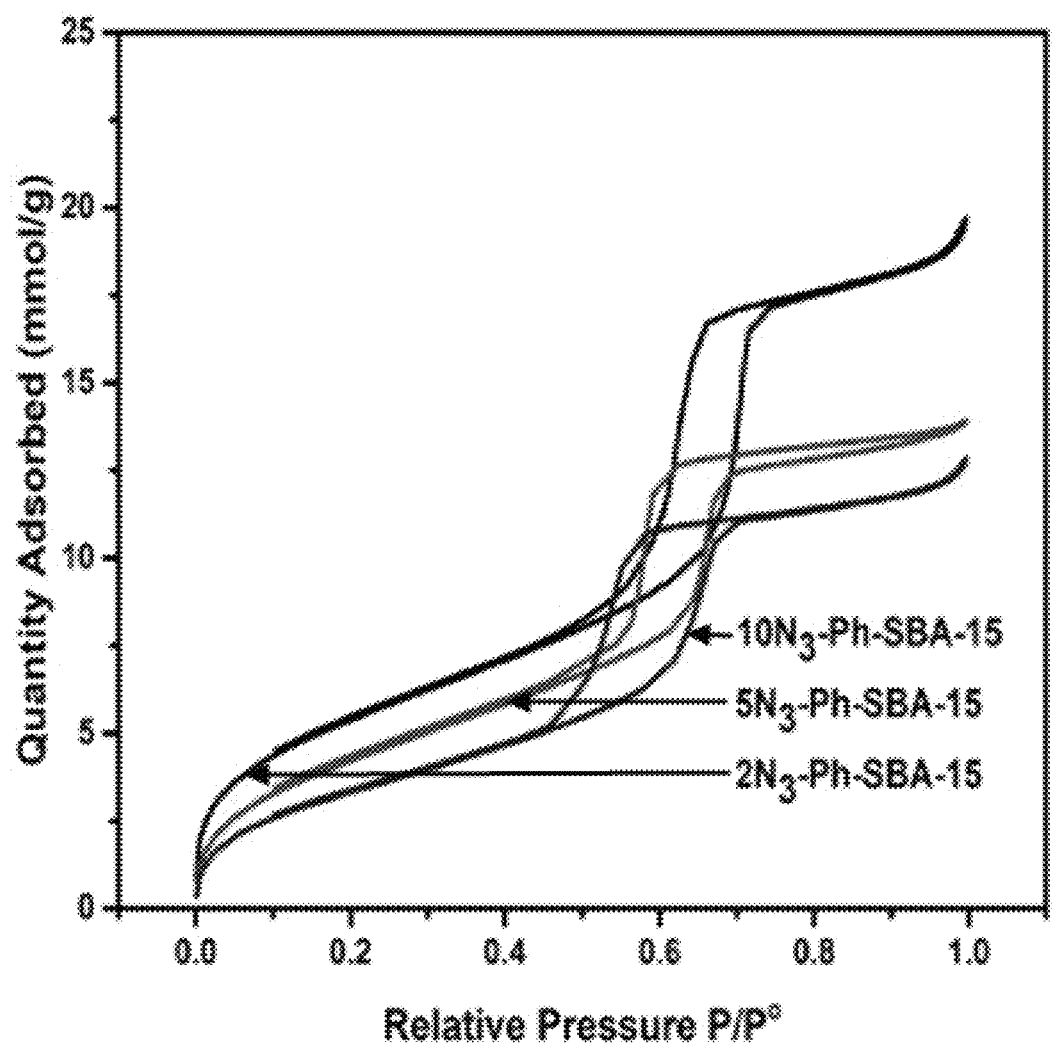
FIG. 3B is the $N_2$-adsorption desorption isotherm of the $xN_3$-Ph-SBA-15 adsorbents showing a type IV isotherm.

The textural properties of synthesized sorbents are presented in Table 2. It was noticed that SBA-15 has the largest Brunauer-Emmett-Teller (BET) surface area (401.2 m$^2$/g), total pore volume (0.816 cm$^3$/g), and pore size (8.2 nm) compared to the other sorbents. It was also noted that as the azide weight loading increases, the surface area, pore volume, and pore size decreases, which implies surface and void blockages occurring due to azide loading. Similarly, the formed 4-phenyl-1,2,3-triazole functionalized SBA-15 showed decreased surface area, pore volume, and pore size as follows: 2N$_3$-Ph-SBA-15>5N$_3$-Ph-SBA-15>10N$_3$-Ph-SBA-15. As expected, the average particle size was observed to increase with azide loading and subsequently with the formation of the clicked products. Thus, SBA-15 has the lowest average particle size of 14.23 nm, and 10N$_3$-Ph-SBA-15 has the largest average particle size of 23.45 nm. The N$_2$-adsorption desorption isotherms of all the sorbents (FIGS. 3A and 3B) display type IV isotherm depicting an H1 hysteresis loop, typical of mesoporous materials. See V. Meynen, P. Cool, E. F. Vansant, Synthesis of siliceous materials with micro- and mesoporosity, Microporous Mesoporous Mater. 104 (2007) 26-38, incorporated herein by reference in its entirety.

TABLE 2

Textural properties of the sorbents

| Adsorbent | BET Surface Area (m$^2$/g) | External Surface Area (m$^2$/g) | Total Pore Volume (cm$^3$/g) | Average Pore Size (nm) | Average particle size (nm) |
|---|---|---|---|---|---|
| SBA-15 | 401.2 | 670.0 | 0.816 | 8.2 | 14.23 |
| 2N$_3$-SBA-15 | 387.3 | 650.1 | 0.765 | 7.9 | 15.49 |
| 5N$_3$-SBA-15 | 328.1 | 554.4 | 0.525 | 6.4 | 18.28 |
| 10N$_3$-SBA-15 | 295.1 | 492.8 | 0.455 | 6.1 | 20.11 |
| 2N$_3$—Ph-SBA-15 | 339.5 | 533.8 | 0.641 | 7.6 | 17.67 |
| 5N$_3$—Ph-SBA-15 | 299.3 | 499.8 | 0.458 | 6.2 | 20.54 |
| 10N$_3$—Ph-SBA-15 | 255.8 | 380.9 | 0.416 | 6.5 | 23.45 |

Figure 4A:
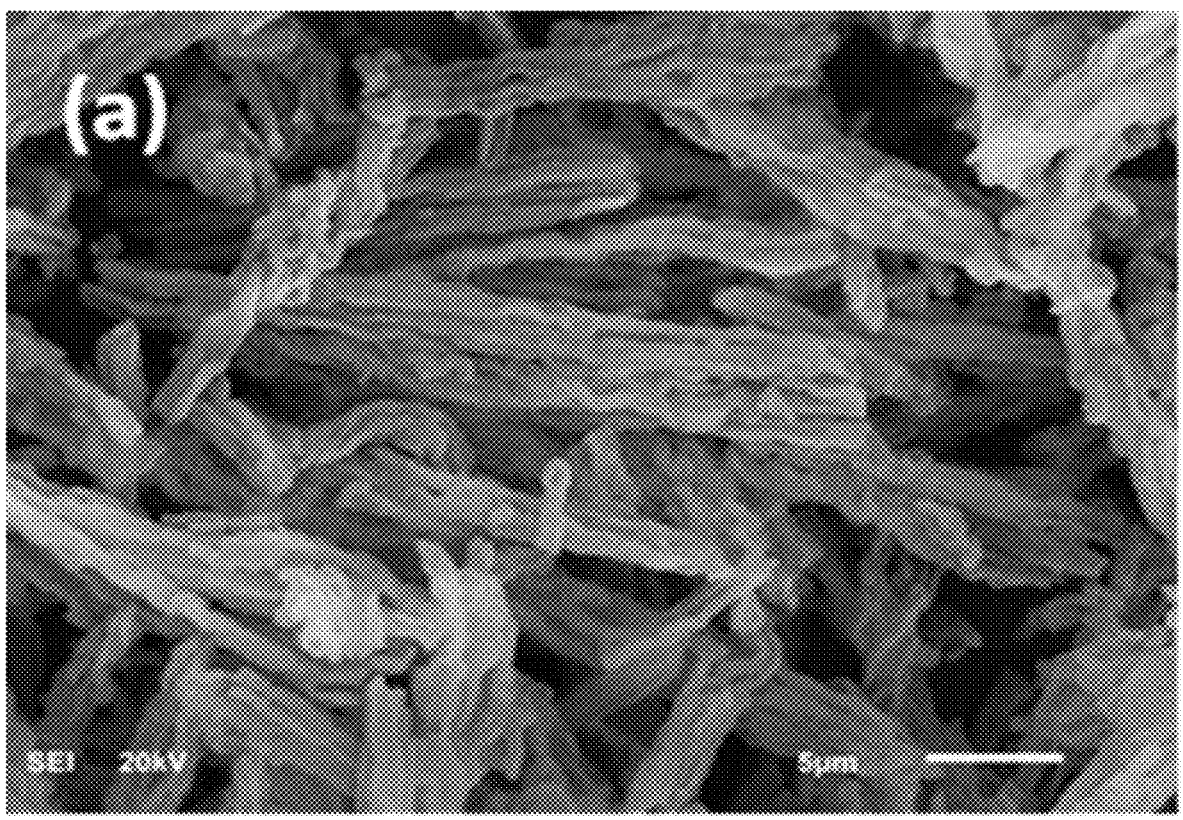
FIG. 4A is an FESEM of the $2N_3$-SBA-15 adsorbent.
Figure 4B:
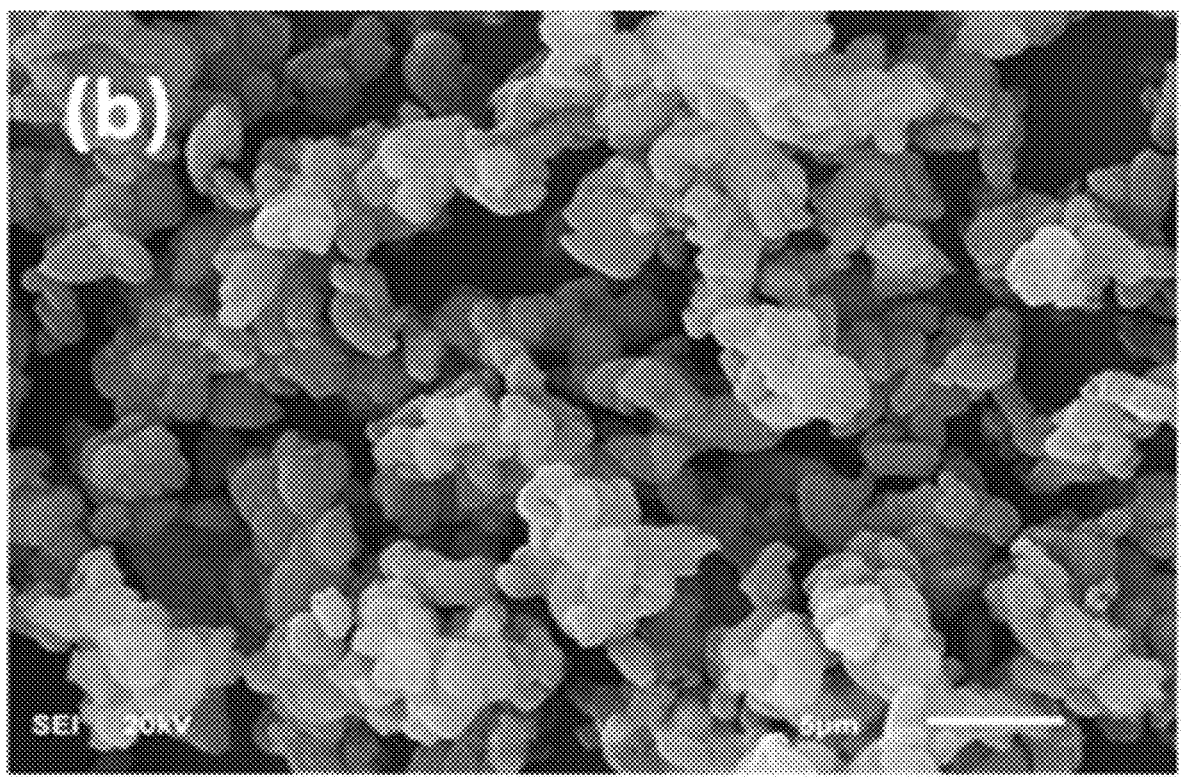
FIG. 4B is an FESEM of the $5N_3$-SBA-15 adsorbent.
Figure 4C:
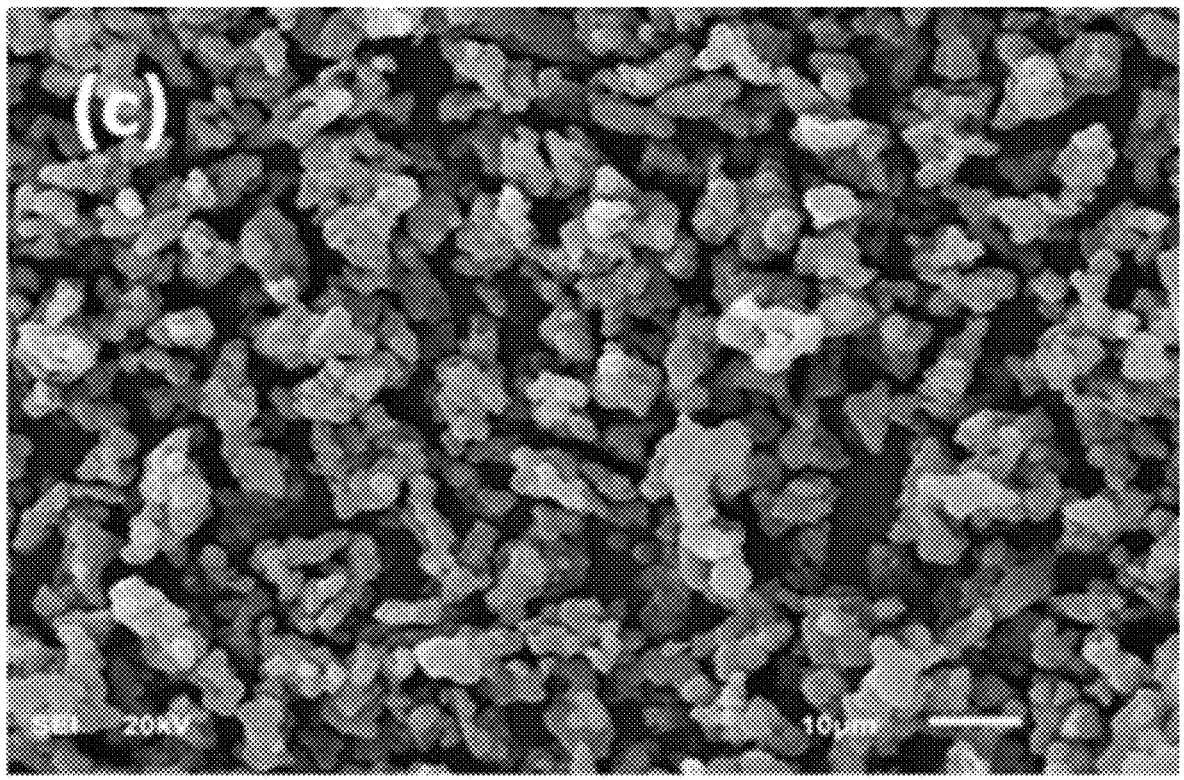
FIG. 4C is an FESEM of the $10N_3$-SBA-15 adsorbent.
Figure 4D:
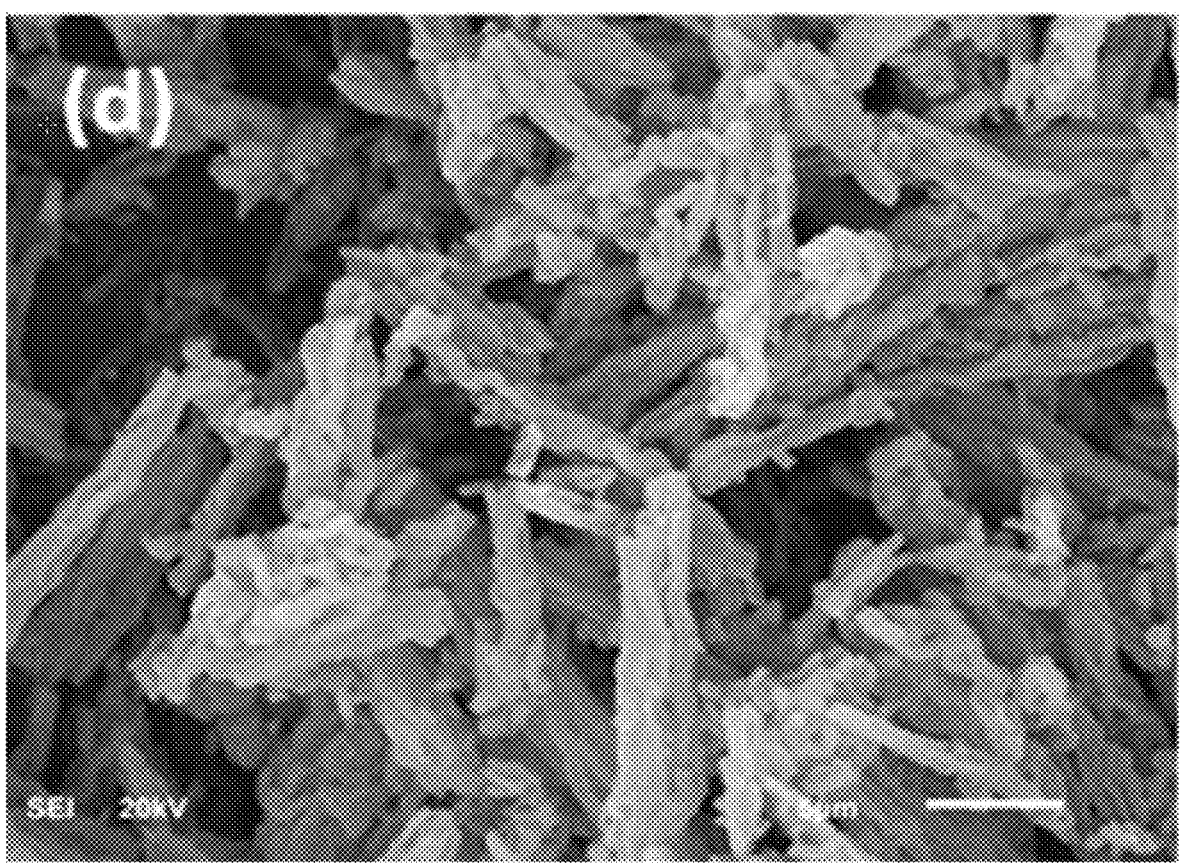
FIG. 4D is an FESEM of the $2N_3$-Ph-SBA-15 adsorbent.
Figure 4E:
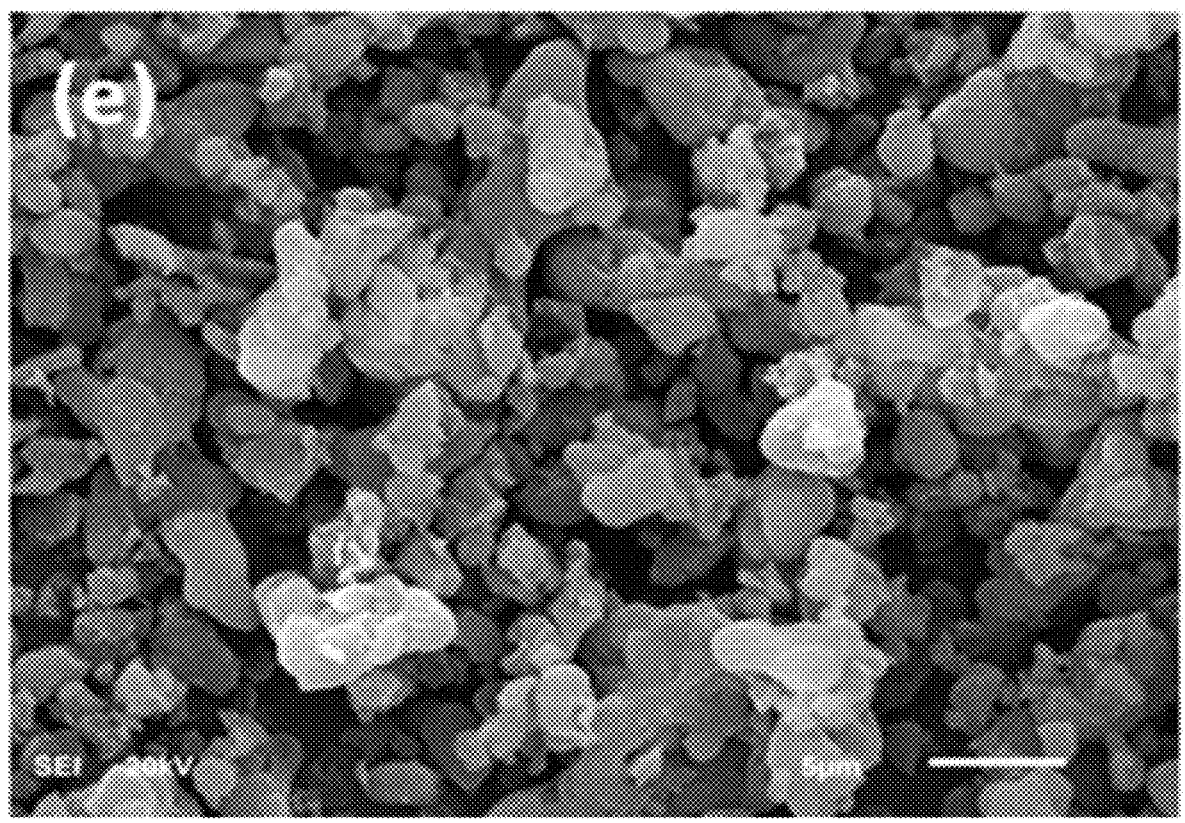
FIG. 4E is an FESEM of the $5N_3$-Ph-SBA-15 adsorbent.
Figure 4F:
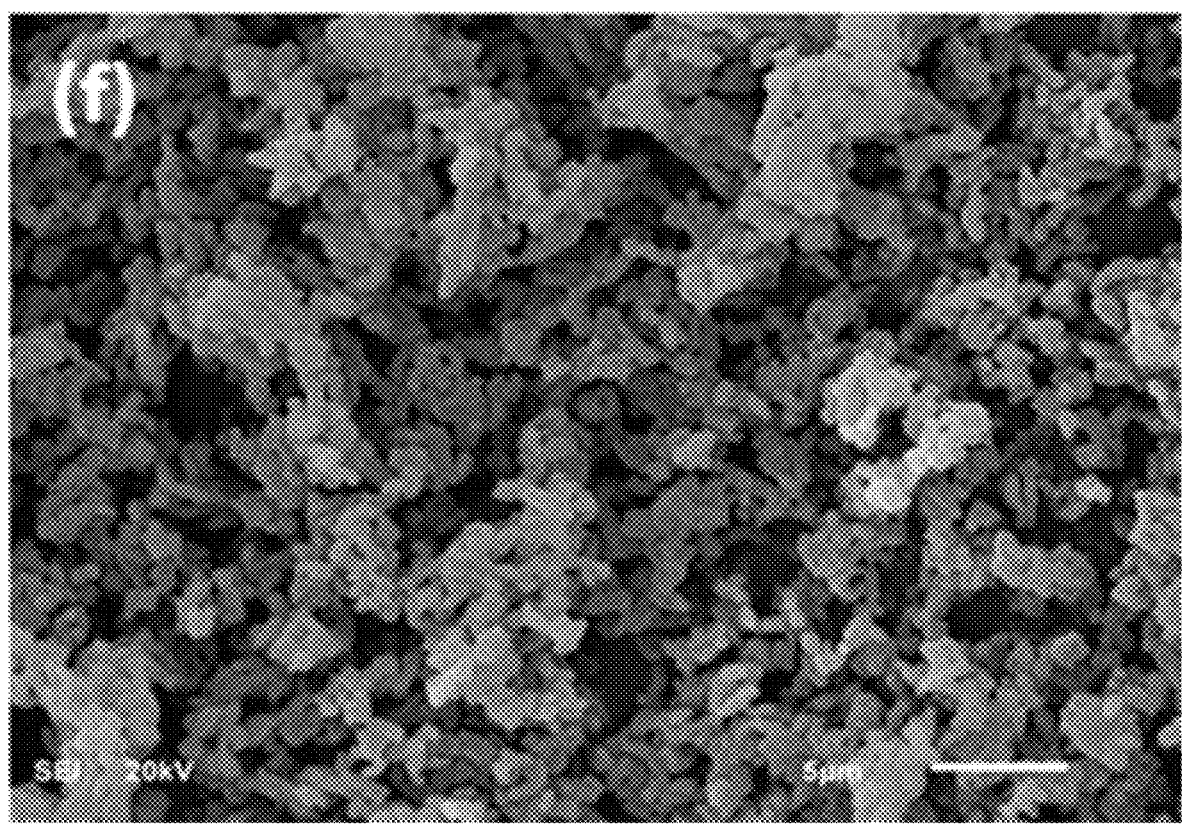
FIG. 4F is an FESEM of the $10N_3$-Ph-SBA-15 adsorbent.

Morphological properties of the series of xN$_3$-SBA-15 and xN$_3$-Ph-SBA-15 were studied using FESEM. FIGS. 4A, 4B, and 4C represent the xN$_3$-SBA-15 in the 2 wt %, 5 wt % and 10 wt % respectively. At 2 wt % azide, a fiber-like structure was observed; however, when the azide loading was increased, a rod-like structure becomes more evident. FIGS. 4D-4F represent the xN$_3$-Ph-SBA-15 and show similar morphology, except for the increased particle density, which is an indication of the clicking of phenylacetylene to the azide group to form xN$_3$-Ph-SBA-15. The EDS elemental composition of the sorbents obtained from their FESEM images is shown in Table 3.

TABLE 3

EDX elemental composition of the sorbents

| Adsorbents | O (%) | Si (%) | N (%) |
|---|---|---|---|
| SBA-15 | 44.8 | 55.2 | — |
| 2N$_3$-SBA-15 | 45.1 | 53.6 | 1.4 |
| 5N$_3$-SBA-15 | 41.8 | 54.3 | 3.9 |
| 10N$_3$-SBA-15 | 38.9 | 53.2 | 7.9 |
| 2N$_3$—Ph-SBA-15 | 40.7 | 57.1 | 2.2 |
| 5N$_3$—Ph-SBA-15 | 39.4 | 56.9 | 3.7 |
| 10N$_3$—Ph-SBA-15 | 38.6 | 53.2 | 8.2 |

Figure 5A:
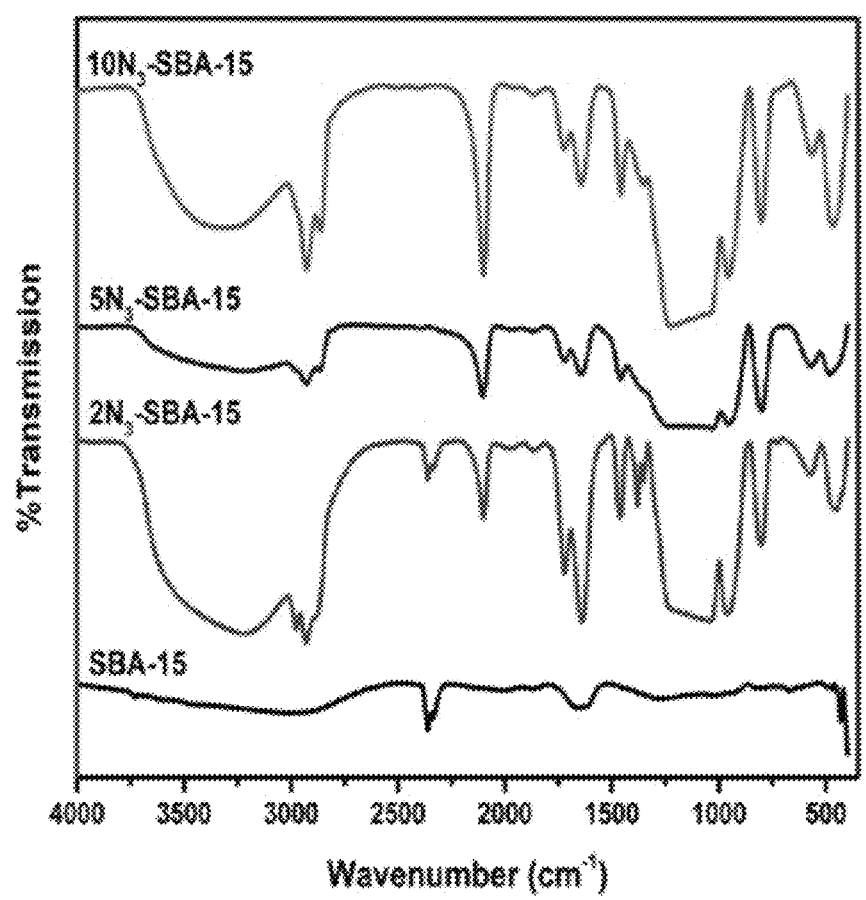
FIG. 5A shows the FTIR spectra of the $xN_3$-SBA-15 and the SBA-15 adsorbents.
Figure 5B:
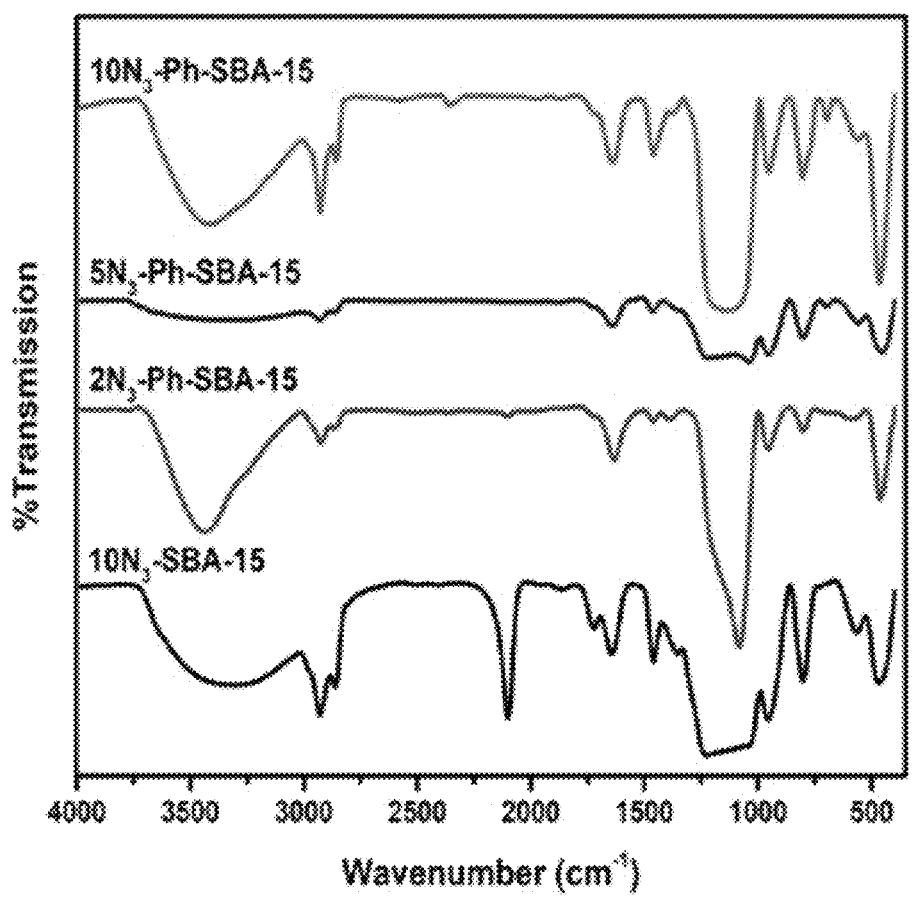
FIG. 5B shows the FTIR spectra of the $xN_3$-Ph-SBA-15 adsorbents.

FTIR spectroscopy is one of the strong tools utilized to unveil the functional groups present in samples of interest. Therefore, FTIR can be used to confirm the incorporation of azide group to the SBA-15 and further prove the formation of xN$_3$-Ph-SBA-15 after the click reaction. The FTIR spectra of series of xN$_3$-SBA-15 and xN$_3$-Ph-SBA-15 are shown in FIGS. 5A and 5B, respectively. In FIG. 5A, the appearance of a new peak at 2150 cm$^{-1}$, which is characteristic of the stretching vibration of azides, confirms that the azides have been successfully incorporated in the SBA-15 framework. It was also observed that the relative peak intensity increases with the increase in the weight loading of the azide group. Interestingly, this azide peak completely disappears in the spectra of xN$_3$-Ph-SBA-15 (FIG. 5B), which confirms that the clicked product has been formed. Other peaks at 3,300 cm$^{-1}$ and 2800 cm$^{-1}$ can be assigned to the —OH and —CH$_2$ stretching vibrations, respectively.

Analysis and Application of 10N$_3$-Ph-SBA-15 packed SB-µ-SPE

Effect of 4-phenyl-1,2,3-triazole Loading on Phenols Extraction

Understanding the chemistry of sorbent-analytes interaction is an important factor in the extraction of the target analytes. In a preferable embodiment the sorbent, in addition to large surface area and porosity, includes the presence of binding sites which will attract phenols. Of particular interest are the nitrogen atoms that formed the triazole ring, which can easily bind to the hydroxyl group of the phenols via hydrogen bonding. The strength of this hydrogen bonding will depend on the substituents attached to the target phenols. Generally, electron-donating groups tend to weaken the hydrogen bonding, whereas electron-withdrawing groups ortho and para to the —OH of phenols tend to strengthen the hydrogen bonding, and the more the number of the electron-withdrawing groups at the ortho and para positions the more the strength of the hydrogen bonding. See M. Fujio, R. T. McIver, R. W. Taft, Effects on the acidities of phenols from specific substituent-solvent interactions. Inherent substituent parameters from gas-phase acidities, J. Am. Chem. Soc. 103 (1981) 4017-4029; and K. C. Gross, P. G. Seybold, Substituent effects on the physical properties and pKa of phenol, in: Int. J. Quantum Chem., Wiley-Blackwell, 2001: pp. 569-579, each incorporated herein by reference in their entirety.

Figure 6:
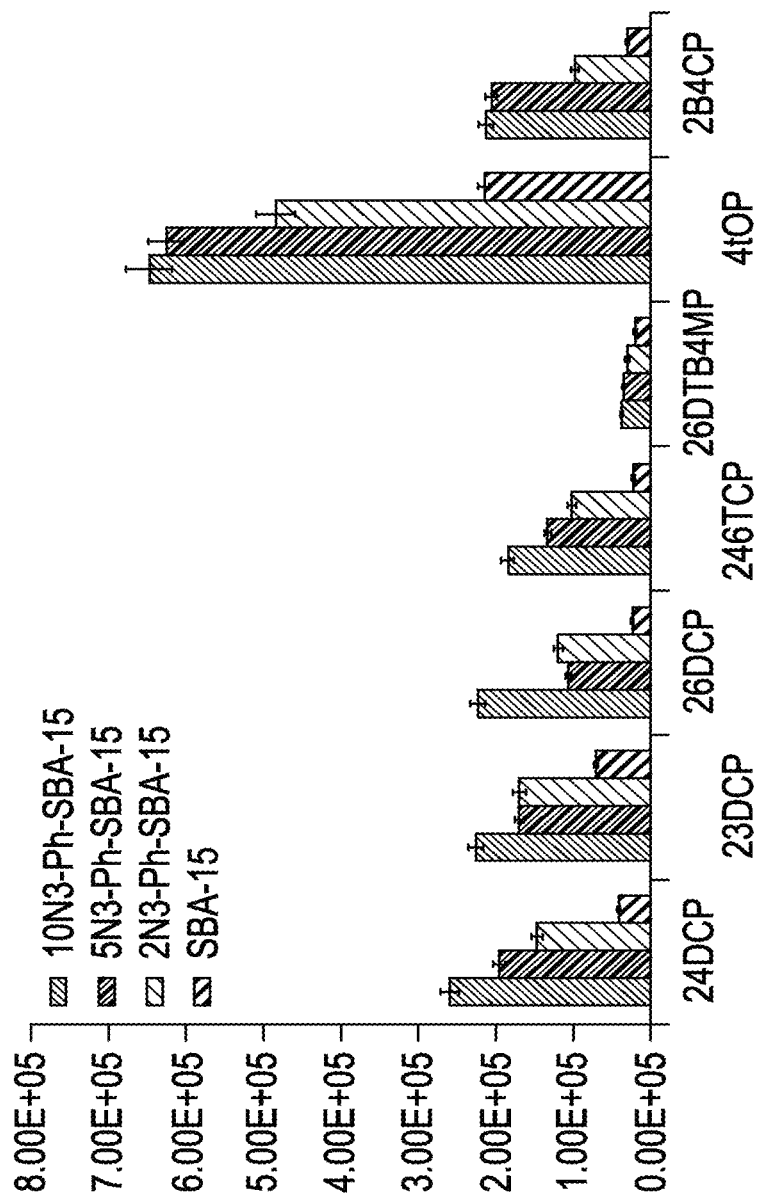
FIG. 6 shows a comparison of sorbent material varied by 4-phenyl-1,2,3-triazole weight %. Conditions: phenol mix concentration: 200 ng $mL^{-1}$; sorbent mass: 30 mg; extraction time: 20 min; desorption solvent: methanol; desorption volume: 200 µL; desorption time: 10 min; salt mass: 1.0 g.

Moreover, the 4-phenyl-1,2,3-triazole functionalized SBA-15 being aromatic can attract the phenols in what is termed strong host-guest interaction via π-π interaction. See C. Li, J. Liu, X. Shi, J. Yang, Q. Yang, Periodic mesoporous organosilicas with 1,4-diethylenebenzene in the mesoporous wall: synthesis, characterization, and bioadsorption properties, J. Phys. Chem. C. 111 (2007) 10948-10954, incorporated herein by reference in its entirety. The degree of interaction, and by extension, the extraction ability, will depend on the available aromatic sites in the sorbent. In addition, the presence of the long chain "11-azidoundecyl-" and the phenyl group in the structure of the functionalized SBA-15 is supposedly going to enhance the extraction of the moderately polar phenols via non-polar-non-polar interactions. Therefore, careful observation of the extraction pattern of the targeted phenols (FIG. 6) shows that the highly polar phenols (24DCP, 23DCP, 26DCP, and 246TCP) are extracted to nearly the same degree since all of them have nearly the same polarity. The slight decrease in the extraction of 246TCP is likely due to the steric hindrance that results from the three-arms chloro-substituent at ortho- and para positions. On the other hand, the degree of extraction of the moderately polar phenols (26DTB4MP; 4tOP, and 2B4CP) is rather dissimilar. 4tOP was extracted in an exceptionally high amount as compared to 26DTB4MP. This might be because 26DTB4MP has strong steric hindrance due to the two-ortho-positioned tertiary butyl groups and the methyl substituent at the para position. In addition, the three substituents are good electron donors, thus weakened the —OH polarity and consequently the hydrogen bonding with 1,2,3-triazole. The observed extraction performance of the sorbents for the seven phenols shown in FIG. 6 follows the trend $10N_3$-Ph-SBA-15>$5N_3$-Ph-SBA-15>$2N_3$-Ph-SBA-15>SBA-15. This is because the $10N_3$-Ph-SBA-15 sorbent has the largest active sites for extraction when compared to the other sorbents, even though the increase in extraction is not proportional to the 4-phenyl-1,2,3-triazole group loading since the surface area and pore size/pore volume of the sorbents decreases as the 4-phenyl-1,2,3-triazole loading increases. This results in some active sites becoming not accessible for the extraction of phenols.

Overall, 4-phenyl-1,2,3-triazole loading increases the extraction performance, thus $10N_3$-Ph-SBA-15 was selected for further extraction experiments.

Sorbent Dosage

Figure 7:
FIG. 7 is a graph illustrating the effect of different sorbent mass: Conditions: phenol mix concentration: 200 ng $mL^-$; sorbent material: $10N_3$-Ph-SBA-15; extraction time: 20 min; desorption solvent: methanol; desorption volume: 200 µL; desorption time: 10 min; salt mass: 1.0 g.

The quantity of sorbent utilized in the phenol extraction is probable to have some effect on the extraction efficiency. It is expected that the larger the sorbent dosage, the greater the number of active sites available for phenol extraction, hence the better the extraction experience. Thus, by keeping other extraction variables constant, the amount of $10N_3$-Ph-SBA-15 sorbent was varied between 5 and 25 mg. It was observed that as the sorbent amount is increased, its extraction performance also increased for the seven different phenols (FIG. 7). The maximum extraction was achieved at 20 mg of the $10N_3$-Ph-SBA-15 sorbent, thus was selected as the amount for further extraction process. Further increase in the sorbent amount shows no significant effect on extraction of phenols, probably because with higher amounts of sorbents, higher extraction and desorption times would be also required.

Desorption Solvent

Figure 8:
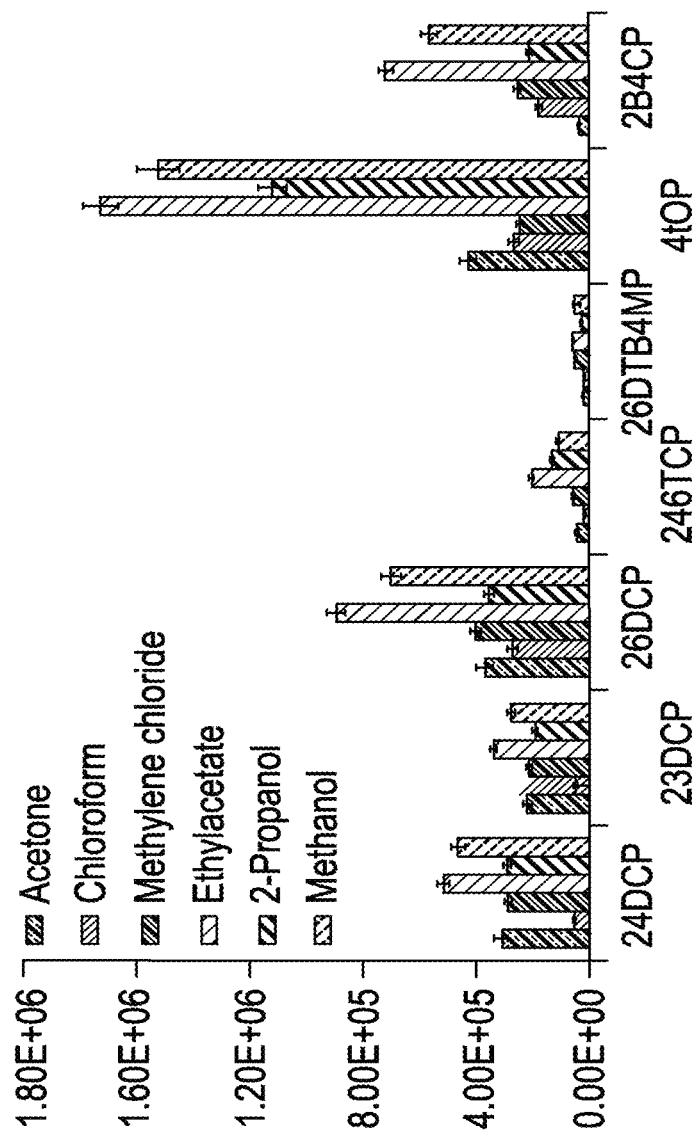
FIG. 8 is a graph illustrating the effect of different types of desorption solvent: Conditions: phenol mix concentration: 200 ng $mL^{-1}$; sorbent material: $10N_3$-Ph-SBA-15; sorbent mass: 20 mg; extraction time: 20 min; desorption volume: 200 µL; desorption time: 10 min; salt mass: 1.0 g.

The choice of desorption solvent is crucial to achieving excellent analyte desorption. Typically, the polarity of the analytes is a criterion to choosing a desorption solvent, and since phenols are relatively polar, by default the best desorption solvent is likely to be polar. Therefore, six different polar solvents: methanol, 2-propanol, acetone, methylene chloride, chloroform, and ethyl acetate were used as desorption solvent. As shown in FIG. 8, ethyl acetate proved to be the best solvent for the desorption of phenols from the $10N_3$-Ph-SBA-15 sorbent. Ethyl acetate, which is a moderately polar solvent, has shown excellent desorption for both highly polar and relatively less polar phenols during ultrasonication desorption steps. Thus, it is considered the desorption solvent to use.

Volume of Desorption Solvent

Figure 9:
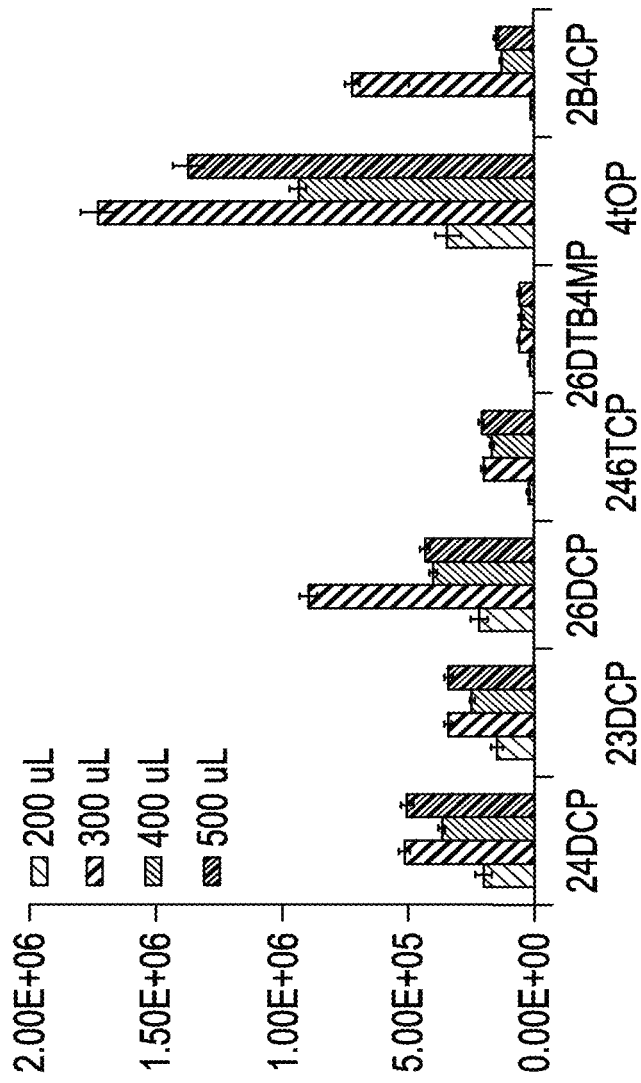
FIG. 9 is a graph illustrating the effect of different desorption solvent volumes: Conditions: phenol mix concentration: 200 ng $mL^{-1}$; sorbent material: $10N_3$-Ph-SBA-15; sorbent mass: 20 mg; extraction time: 20 min; desorption solvent: ethyl acetate; desorption time: 10 min; salt mass: 1.0 g.

It is anticipated that solvent volume applied in desorbing analytes alters the efficiency and reproducibility of the desorption. Here, the effect of solvent volume was assessed in the range of 200-500 µL. It was observed that the largest desorption for the analytes was achieved using 300 µL for all the extracted phenols (FIG. 9). Above 300 µL solvent volume, the desorption proficiency decreases proportionately with the boost in volume. This observed trend is probably due to the dilution of the analytes at desorption volumes above 300 µL, thus resulting in lower response during analysis. On the contrary, lower desorption volumes (<300 µL) result in partial immersion of the SB-µ-SPE device, hence decreased desorption efficiency, and irreproducibility of the analysis in some cases. Therefore, 300 µL was chosen as the best desorption volume for subsequent extraction procedures.

Salting Out Effect

Figure 10:
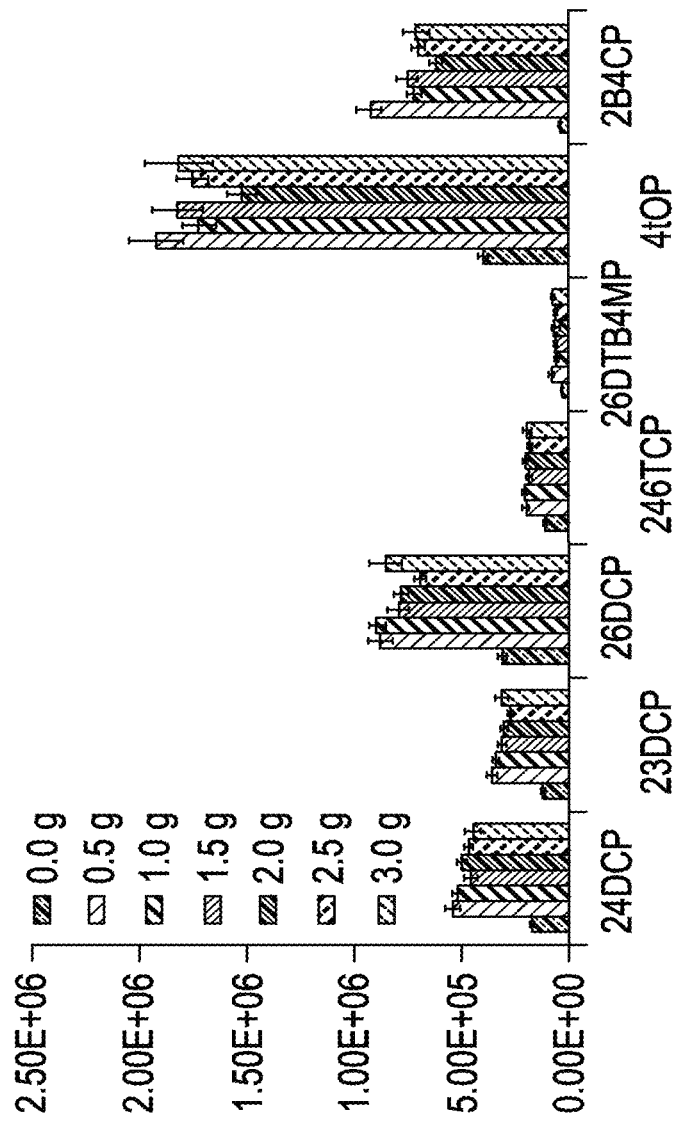
FIG. 10 is a graph illustrating the effect of salt addition: Conditions: phenol mix concentration: 200 ng $mL^{-1}$; sorbent material: $10N_3$-Ph-SBA-15; sorbent mass: 20 mg; extraction time: 20 min; desorption solvent: ethyl acetate; desorption volume: 300 µL; desorption time: 10 min.

Depending upon the nature of the analyte, the salting out effect was evaluated. Generally, the addition of salt can result in enhanced analyte extraction or vice versa. By adding salt to the sample solution, it is anticipated that the target analytes' solubility in aqueous solution will decrease, especially if the target analytes are polar compounds. This will consequently result in increased extraction of the analytes. In this extraction experiment, 0.5-3 g of sodium chloride (NaCl) was added to the sample solution, and it was noticed that maximum extraction of the analytes is reached with 0.5 g of NaCl for the studied phenols (FIG. 10). Further addition of the salt had no substantial effect on the phenols extraction. Therefore, 0.5 g was considered as the amount of NaCl to use in this procedure.

Extraction Time

Figure 11:
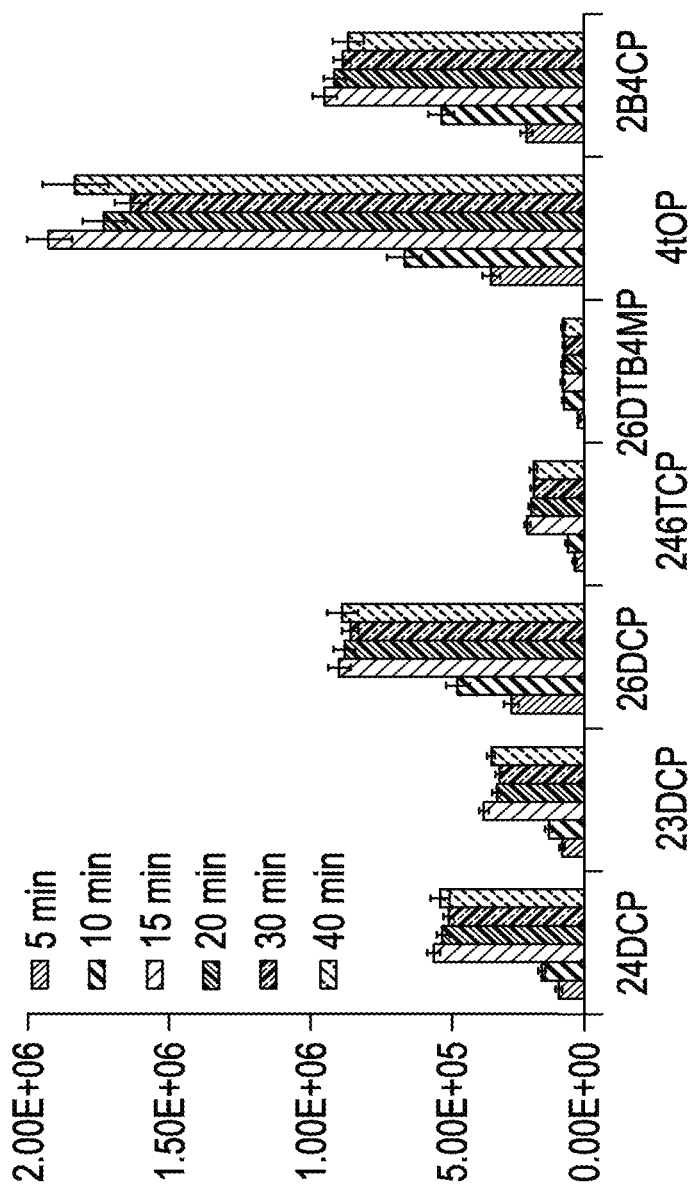
FIG. 11 is a graph illustrating the effect of different extraction times: Conditions: phenol mix concentration: 200 ng $mL^{-1}$; sorbent material: $10N_3$-Ph-SBA-15; sorbent mass: 20 mg; desorption solvent: ethyl acetate; desorption volume: 300 µL; desorption time: 10 min; salt mass: 0.5 g.

SB-µ-SPE is an equilibrium based, non-exhaustive technique; therefore, extraction time is a vital parameter to examine. The extraction of the analytes generally increases with increasing time until equilibrium is established. In the present disclosure, extraction time was varied between 5 min to 40 min, and it was found that 20 min is the best extraction time as shown in FIG. 11.

Desorption Time

Figure 12:
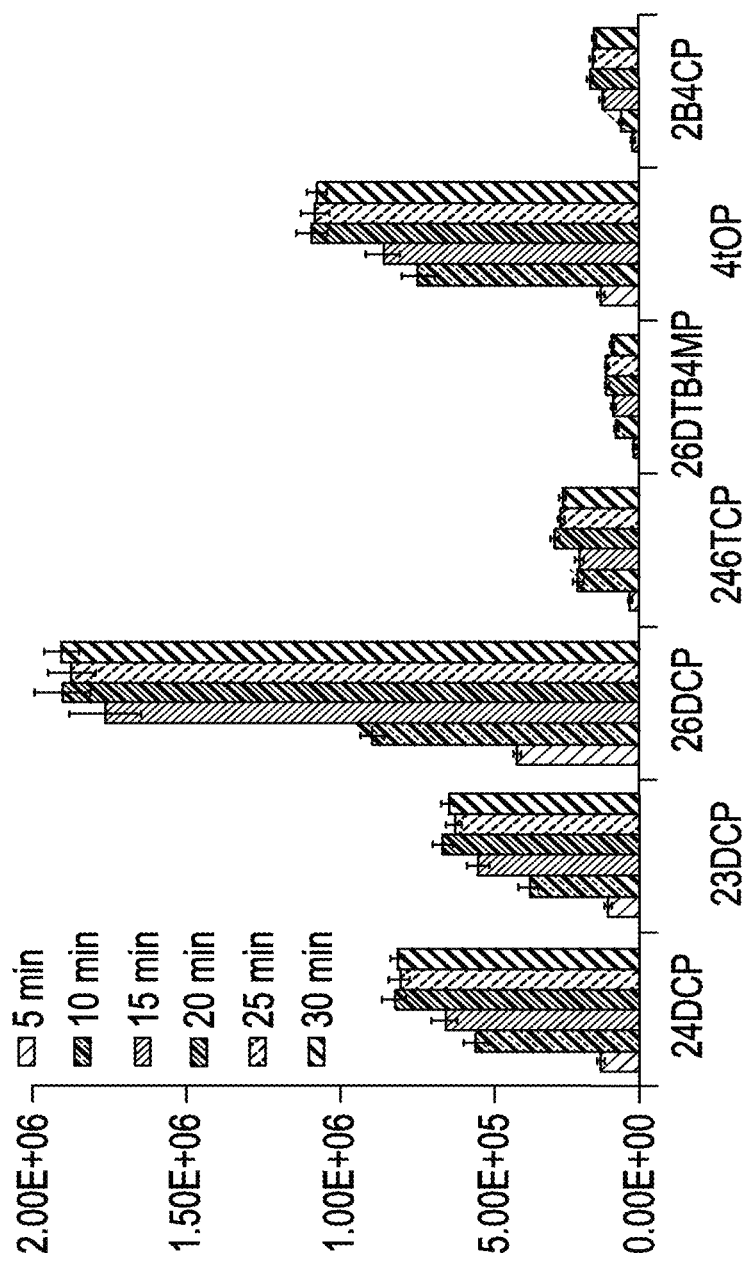
FIG. 12 is a graph illustrating the effect of different desorption times: Conditions: phenol mix concentration: 200 ng $mL^{-1}$; sorbent material: $10N_3$-Ph-SBA-15; sorbent mass: 20 mg; extraction time: 15 min; desorption solvent: ethyl acetate; desorption volume: 300 µL; salt mass: 0.5 g.

Alike extraction time, desorption time is also an imperative parameter in maximization of the extraction procedure. The desorption was done by submerging the analyte-bound SB-µ-SPE in ethyl acetate followed by sonication. The sonication time was varied between 5-30 min. It was observed that as the desorption time increases, the desorption of the target analytes into the ethyl acetate also increases until 20 min (FIG. 12). After that, the desorption remains stable up to 30 min. Therefore, 20 min was selected as the desorption time to use.

Stirring Rate

The mass transfer of analytes to and from the SB-µ-SPE device may also be affected by the stirring rate during the extraction process. Therefore, the stirring rate was varied between 300-1200 rpm. Interestingly, no significant effect in the extraction efficiency was noticed within the varied stirring rate.

Analytical Parameters and Real Sample Analysis

The extraction of the phenols using $10N_3$-Ph-SBA-15 sorbent packed inside SB-µ-SPE device and its GC-MS analysis was evaluated for different analytical parameters under the experimental conditions chosen by the above tests. The analysis was found to have a linear response between 1 ng mL$^{-1}$ to 600 ng mL$^{-1}$. Excellent linearity was observed from the calibration curve with $R^2$ ranging between 0.9941 and 0.9989. Three concentrations were selected out of the linear calibration curve, and seven trials were designed for each concentration to assess the reproducibility of the analysis. The analysis has shown good reproducibility with less than 7.5% difference. The extraction and analysis overall produced lower LODs between 0.23 to 0.37 ng mL$^{-1}$ (S/N=3) as presented in Table 4.

functionalized SBA-15 sorbents (xN$_3$-Ph-SBA-15; x=2-10 wt. %) via two steps: azide functionalization of SBA-15 and its click reaction with phenylacetylene. The formed sorbents, which have the blend of both polar (1,2,3-triazole) and non-polar (long chain alkyl groups) sites were characterized using magic angle spinning NMR, surface area, pore size/pore volume N$_2$ adsorption-desorption isotherms, scanning electron microscope, and Fourier transform infra ray spectroscopy. The surface area and pore size/pore volume decreases with increasing loading of 4-phenyl-1,2,3-triazole. The sorbents were used in a stir bar-supported micro-solid-phase extraction (SB-µ-SPE) method for phenols in water samples, in combination with gas chromatography-mass spectrometry (GC-MS). In a preferred embodiment, 10N$_3$-Ph-SBA-15 sorbent was used with a 20 mg dosage; 20 min extraction time; 300 µL of ethyl acetate as desorption solvent, 20 min desorption time; and ionic strength set at 0.5 g NaCl. The approach provided a linear detection range for all tested phenols with R$^2$ value up to 0.9989 and detection limit (LOD) of 0.23-0.37 ng mL$^{-1}$. Relative standard devia-

TABLE 4

Analytical features of the method

| Compound | Linear range* (ng/mL) | R$^2$ | LOD (ng/mL) | Matrix effect and extraction efficiency (Mean relative recoveries n = 3) | | | RSDs (%) (n = 7) | | |
|---|---|---|---|---|---|---|---|---|---|
| | | | | 1 ng/mL | 100 ng/mL | 400 ng/mL | 1 ng/mL | 100 ng/mL | 400 ng/mL |
| 24DCP | 1-600 | 0.9989 | 0.24 | 96.8 | 98.8 | 94.5 | 4.5 | 3.9 | 3.3 |
| 23DCP | 1-600 | 0.9989 | 0.25 | 95.3 | 96.5 | 95.5 | 7.5 | 6.8 | 6.6 |
| 26DCP | 1-600 | 0.9941 | 0.23 | 92.5 | 89.3 | 88.5 | 6.6 | 5.1 | 5.2 |
| 246TCP | 1-600 | 0.9951 | 0.30 | 95.8 | 98.2 | 99.2 | 5.5 | 4.5 | 4.1 |
| 26DTB4MP | 1-600 | 0.9984 | 0.37 | 97.8 | 98.5 | 98.8 | 3.5 | 4.5 | 2.3 |
| 4tOP | 1-600 | 0.9977 | 0.24 | 88.6 | 88.9 | 90.8 | 5.2 | 5.1 | 4.8 |
| 2B4CP | 1-600 | 0.9972 | 0.29 | 93.5 | 95.8 | 97.8 | 7.2 | 6.2 | 5.1 |

Figure 13:
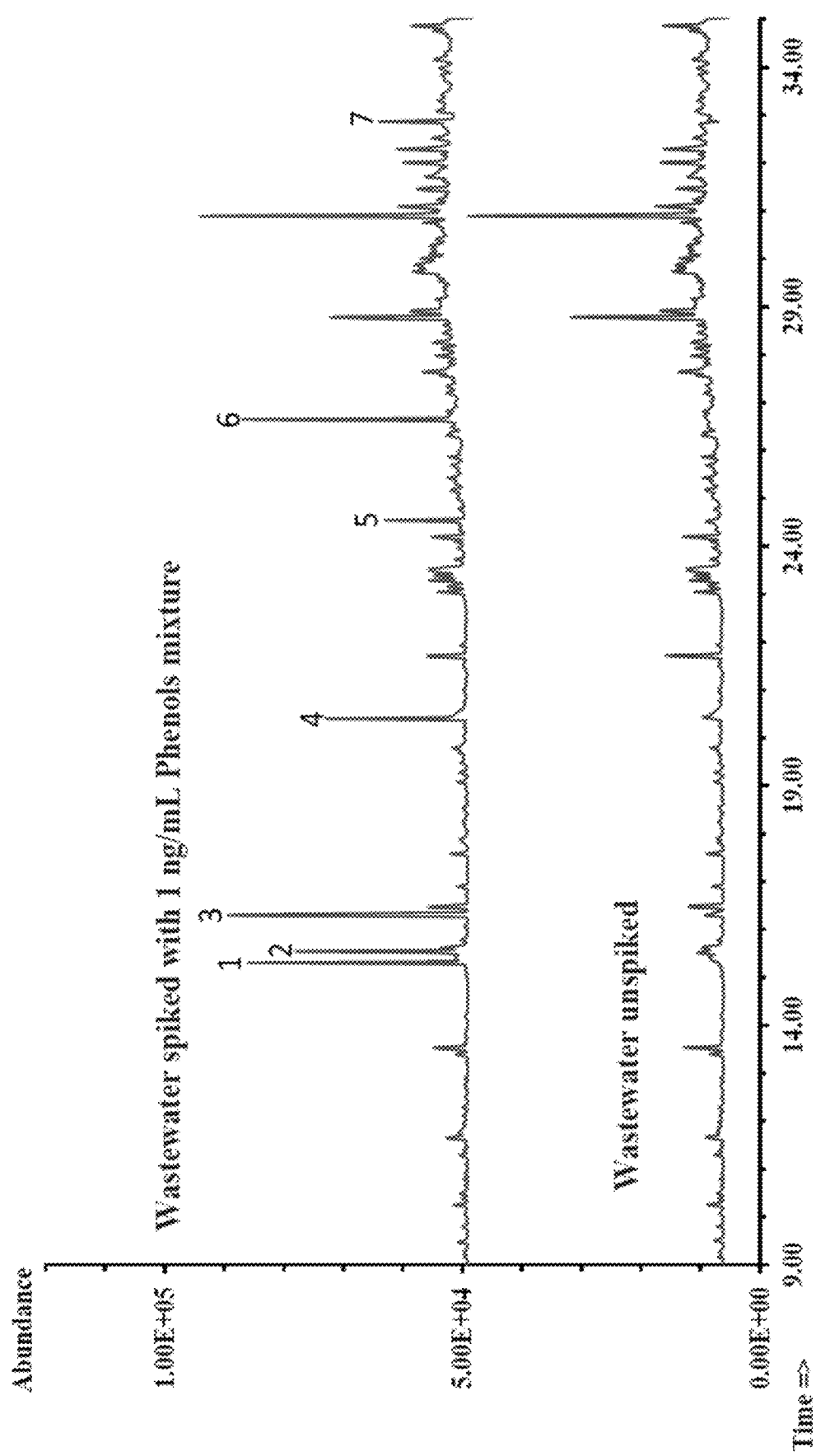
FIG. 13 illustrates GC-MS overlaid chromatograms of unspiked wastewater and wastewater spiked with 1 ng $mL^{-1}$ of the phenols mixture.

The analysis was also tested in a real wastewater sample. The selected phenols were not detected in the wastewater sample; however, wastewater spiked with 1, 100, and 400 ng mL$^{-1}$ concentrations have shown high relative recoveries in the range of 88.5 to 99.2%. The chromatogram showing the wastewater unspiked and spiked with 1 ng mL$^{-1}$ is presented in FIG. 13. Here, peak 1=2,4-dichlorophenol; peak 2=2,3-dichlorophenol; peak 3=2,6-dichlorophenol; peak 4=2,4,6-trichlorophenol; peak 5=2,6-di-tert-butyl-4-methylphenol; peak 6=4-tert-octylphenol; peak 7=2-benzyl-4-chlorophenol. Comparison of this extraction approach with recently published work presented in Table 5 showed that with this novel sorbent in SB-µ-SPE, phenols can be extracted with comparable results to the other methods.

TABLE 5

Comparison of SB-µ-SPE with published methods

| Method | Linear Range (µg L$^{-1}$) | No. of phenols analyzed | Real sample type | LODs (µg L$^{-1}$) | RSDs (%) | Ref. |
|---|---|---|---|---|---|---|
| SMSME$^1$-HPLC | 5-150 | 7 | Agricultural and lake water | 1-4 | ≤10.1 | [35] |
| Fiber SPME$^2$-GCMS | 0.1-100 | 7 | Honey samples | 0.06-0.2 | 3.8-12.7 | [36] |
| SBSE$^3$-HPLC-UV | 0.25, 0.5, 1 to 500 | 8 | Lake and river sample | 0.08-0.30 | 4.3-9.4 | [37] |
| ASE-DLLME$^4$-GCMS | 6.1-3080 | 4 | Soil sample | 0.06-1.83 | <10 | [38] |
| MAMDSPE$^5$-HPLC | 2-80 | 8 | Tap water | 1.3 | <13-17 | [39] |
| 10N$_3$—Ph-SBA-15-based SB-µ-SPE-GCMS | 1-600 | 7 | Wastewater | 0.23-0.37 | 2.3-7.5 | This work |

$^1$Supramolecular solvent based microextraction
$^2$Fiber solid phase microextraction
$^3$Stir-bar sorptive extraction
$^4$Accelerated solvent extraction-dispersive liquid-liquid microextraction
$^5$Magnetic assisted micro-dispersive solid phase extractions An effective strategy for the extraction of highly to moderately polar phenols in water samples was shown above by synthesizing series of 4-phenyl-1,2,3-triazole tion (RSD) values determined at varied concentrations were within 2.3-7.5%. With this developed 4-phenyl-1,2,3-triazole functionalized SBA-15 sorbents, the analysis of phenols in wastewater matrix has successfully presented relative recoveries in the range of 88.5 to 99.2%.

The invention claimed is:

1. An azole functionalized silica sorbent comprising:
porous silica nanoparticles having a surface functionalized with a 4-phenyl-1,2,3-triazole conjugated system attached by an undecyl group,
and
wherein the porous silica nanoparticles have an average particle size of 10-80 nm.

2. The azole functionalized silica sorbent of claim 1, wherein the porous silica nanoparticles are clustered in agglomerates having an average diameter of 1-4 μm.

3. The azole functionalized silica sorbent of claim 1, wherein the porous silica nanoparticles have an average pore size in a range of 4-9 nm.

4. The azole functionalized silica sorbent of claim 1, wherein the porous silica nanoparticles have a BET surface area of 200-380 m$^2$/g.

5. The azole functionalized silica sorbent of claim 1, wherein the porous silica nanoparticles have a total pore volume in a range of 0.380-0.700 cm$^3$/g.

6. The azole functionalized silica sorbent of claim 1, which has 3-12 wt % N relative to a total weight of the azole functionalized silica sorbent.

7. The azole functionalized silica sorbent of claim 1, which has 50-58 wt % Si relative to a total weight of the azole functionalized silica sorbent.

* * * * *